US012739121B2

(12) United States Patent
Wagner et al.

(10) Patent No.: US 12,739,121 B2
(45) **Date of Patent: *Sep. 15, 2026**

(54) PRIVACY-PRESERVING IDENTITY ATTRIBUTE VERIFICATION USING POLICY TOKENS

(71) Applicant: Visa International Service Association, San Francisco, CA (US)

(72) Inventors: Kim Ritter Wagner, Sunnyvale, CA (US); Sunpreet Singh Arora, Union City, CA (US); Gaven James Watson, Palo Alto, CA (US); Mihai Christodorescu, Belmont, CA (US); Shashank Agrawal, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,400

(22) Filed: May 24, 2024

(65) Prior Publication Data

US 2024/0313971 A1 Sep. 19, 2024

Related U.S. Application Data

(63) Continuation of application No. 16/928,367, filed on Jul. 14, 2020, now Pat. No. 12,028,455.

(51) Int. Cl.
*H04L 9/32* (2006.01)
*H04L 9/08* (2006.01)

(52) U.S. Cl.
CPC .......... *H04L 9/3213* (2013.01); *H04L 9/0825* (2013.01); *H04L 9/0866* (2013.01); *H04L 9/3221* (2013.01); *H04L 9/3247* (2013.01)

(58) Field of Classification Search
CPC ... H04L 9/3213; H04L 9/0825; H04L 9/0866; H04L 9/3221; H04L 9/3247
See application file for complete search history.

(56) References Cited

U.S. PATENT DOCUMENTS 10,505,733 B2 12/2019 Rowe et al.
10,692,085 B2 6/2020 Zagarese et al.
(Continued)

FOREIGN PATENT DOCUMENTS

JP 2019503541 A 2/2019
WO 2019217936 A1 11/2019

OTHER PUBLICATIONS

Camenisch et al., (Concepts and Languages for Privacy-Preserving Attribute-Based Authentication, IFIP AICT 396, p. 34â52, 2013) (Year: 2013).*

(Continued)

*Primary Examiner* — Oleg Korsak
(74) *Attorney, Agent, or Firm* — Kilpatrick Townsend & Stockton LLP

(57) ABSTRACT

Methods and systems for privacy-preserving identity attribute verification are presented. During an interaction between a relying entity and a user, a relying entity computer can transmit a policy token to a user device. The policy token may indicate the information needed by the relying entity in order to perform the interaction. The user device can verify the policy token, then use the policy token in conjunction with an identity token to generate a zero-knowledge proof. The user device may transmit the zero-knowledge proof to an identity service provider computer. The identity service provider computer may verify the zero-knowledge proof, then generate a verification message. The identity service provider computer may sign the verification message and transmit the signed verification mes- (Continued)

sage to the relying entity computer. The relying entity computer may verify the verification message and complete the interaction with the user.

20 Claims, 10 Drawing Sheets

(56) References Cited

U.S. PATENT DOCUMENTS

| | | | |
|---|---|---|---|
| 10,915,890 | B2 | 2/2021 | Douglas et al. |
| 11,121,873 | B2 * | 9/2021 | Schmaltz .............. H04L 9/3242 |
| 11,212,102 | B2 | 12/2021 | Ortiz et al. |
| 11,716,617 | B2 * | 8/2023 | Wentz ................. H04L 63/0807 713/168 |
| 12,028,455 | B2 * | 7/2024 | Wagner ............... H04L 63/0807 |
| 12,242,652 | B2 * | 3/2025 | Buck ....................... G06F 21/62 |
| 2007/0192619 | A1 | 8/2007 | Gifford et al. |
| 2008/0229383 | A1 | 9/2008 | Buss et al. |
| 2008/0289020 | A1 | 11/2008 | Cameron et al. |
| 2010/0199089 | A1 | 8/2010 | Vysogorets et al. |
| 2011/0202991 | A1 | 8/2011 | Paquin et al. |
| 2011/0296512 | A1 | 12/2011 | Dietrich et al. |
| 2013/0014207 | A1 | 1/2013 | Hodgkinson et al. |
| 2013/0036456 | A1 | 2/2013 | Boysen et al. |
| 2013/0276087 | A1 | 10/2013 | Bjones et al. |
| 2013/0276131 | A1 * | 10/2013 | Bjones ................ G06F 21/6263 726/26 |
| 2015/0058950 | A1 | 2/2015 | Miu |
| 2017/0250972 | A1 | 8/2017 | Ronda et al. |
| 2018/0165781 | A1 | 6/2018 | Rodriguez et al. |
| 2018/0173906 | A1 | 6/2018 | Rodriguez et al. |
| 2018/0181964 | A1 | 6/2018 | Zagarese et al. |
| 2018/0189780 | A1 | 7/2018 | Douglas et al. |
| 2019/0097802 | A1 | 3/2019 | Rowe et al. |
| 2019/0149524 | A1 | 5/2019 | Bankston et al. |
| 2019/0158487 | A1 | 5/2019 | Hayes et al. |
| 2019/0164151 | A1 | 5/2019 | Doney et al. |
| 2019/0372993 | A1 | 12/2019 | Dunjic et al. |
| 2020/0014537 | A1 | 1/2020 | Ortiz et al. |
| 2020/0067907 | A1 | 2/2020 | Avetisov et al. |
| 2020/0084036 | A1 | 3/2020 | Rowe et al. |
| 2020/0162251 | A1 | 5/2020 | Wentz |
| 2020/0169879 | A1 | 5/2020 | Linton et al. |
| 2020/0186352 | A1 | 6/2020 | Arora et al. |
| 2020/0220870 | A1 | 7/2020 | Wagner et al. |
| 2020/0259652 | A1 | 8/2020 | Schmaltz, III et al. |
| 2020/0280550 | A1 | 9/2020 | Lindemann et al. |
| 2021/0065267 | A1 | 3/2021 | Smith et al. |
| 2021/0320799 | A1 | 10/2021 | Bankston |
| 2021/0326426 | A1 | 10/2021 | Bouse |
| 2022/0174494 | A1 * | 6/2022 | Richardson ......... H04W 12/128 |

OTHER PUBLICATIONS

U.S. Appl. No. 16/928,367 , "Advisory Action", Dec. 15, 2022, 4 pages.
U.S. Appl. No. 16/928,367 , "Final Office Action", Oct. 7, 2022, 40 pages.
U.S. Appl. No. 16/928,367 , "Final Office Action", Dec. 8, 2023, 44 pages.
U.S. Appl. No. 16/928,367 , "First Action Interview Office Action Summary", Jul. 13, 2022, 9 pages.
U.S. Appl. No. 16/928,367 , "First Action Interview Pilot Program Pre-Interview Communication", Jun. 10, 2022, 5 pages.
U.S. Appl. No. 16/928,367 , "Non-Final Office Action", May 11, 2023, 42 pages.
U.S. Appl. No. 16/928,367 , "Notice of Allowance", Feb. 26, 2024, 5 pages.
Almaden et al., "Specification of the Identity Mixer Cryptographic Library", XP093100983, Available online at: https://dominoweb.draco.res.IBM.com/reports/rz3730_revised.pdf, Apr. 29, 2010, pp. 1-48.
Bemmann et al., "Fully-Featured Anonymous Credentials with Reputation System", Image, Video and Signal Processing, XP059173221, Sep. 5, 2018, pp. 1-22.
Ben-Sasson , "Succinct Non-Interactive Zero-knowledge for a von Neumann Architecture", Cryptology ePrint Archive, Report 2013/879, 2013, 37 pages.
Camenisch et al., "Concepts and Languages for Privacy-Preserving Attribute-Based Authentication", Policies and Research in Identity Management, vol. 396, XP055122746, Jan. 1, 2013, 18 pages.
De La Piedra , "Integration of Hardware Tokens in the Idemix Library", International Association for Cryptologic Research, XP061016876, Sep. 3, 2014, 17 pages.
EP21842395.2 , "Extended European Search Report", Nov. 29, 2023, 10 pages.
Gennaro et al., "Quadratic Span Programs and Succinct NIZKs without PCPs", EUROCRYPT, Originally Published as Cryptology ePrint Archive, Report 2012/215, 2013, 59 pages.
Parno et al., "Pinocchio: Nearly Practical Verifiable Computation", Communications of the ACM, vol. 59, No. 2, May 19-22, 2013, 16 pages.
PCT/US2021/041314 , "International Preliminary Report on Patentability", Jan. 26, 2023, 7 pages.
PCT/US2021/041314 , "International Search Report and Written Opinion", Oct. 26, 2021, 13 pages.
Application No. EP21842395.2 , Office Action, Mailed On Apr. 9, 2026, 7 pages.
Application No. CN202180049517.8, Office Action, Mailed On Jun. 19, 2026, 10 pages.

* cited by examiner

PRIVACY-PRESERVING IDENTITY ATTRIBUTE VERIFICATION USING POLICY TOKENS

CROSS-REFERENCE TO RELATED APPLICATIONS

This application is a continuation of U.S. patent application Ser. No. 16/928,367, filed on Jul. 14, 2020, which is herein incorporated by reference in its entirety.

BACKGROUND

Entities or organizations are sometimes required to collect or verify information about other entities with which they interact. For example, government agencies that regulate motor vehicles may need to verify a person's citizenship status or age before issuing a driver's license. Usually, a person will verify their age by providing identification documents such as a birth certificate. Likewise, commercial businesses often need to verify information as part of "know your customer" requirements. For example, a liquor store may verify that a customer is of legal age before selling alcohol to the customer. In the United States, a customer will usually present a liquor store employee with identity documents, such as a driver's license, in order to verify their age.

In several common contexts however, this identity verification model presents challenges or inconveniences to the person being verified (e.g., the customer making an age restricted purchase). One such problem is the inconvenience associated with carrying around various forms of identification. At any given moment, a user may need to carry a large number of identity documents with them, such as a driver's license, a medical insurance card, a library card, job identification (such as a press pass), a transit card, etc. Managing these multiple ID documents may be frustrating, and it can be a serious inconvenience if any are lost or stolen.

Additionally, identity verification processes may be time-consuming or inconvenient for users. One such example is when a self-checkout process (at a supermarket) is interrupted in order for the user's identity to be verified. With self-checkout, a user can quickly and efficiently pay for groceries without involving a store clerk. However, if the user attempts to purchase age restricted products such as alcohol, the self-checkout process will halt. The self-checkout kiosk will call over a store clerk who then verifies the age of the customer before the self-checkout process can continue. As a result, the self-checkout process is slowed considerably, which may frustrate the customer.

Another problem with identity verification involves preserving user privacy. Typically an entity or organization only needs to verify a small subset of the information presented on an identity document. For example, a driver's license may include a driver's license number, an expiration date, a first name, a last name, an address, a date of birth, gender information, hair color, eye color, height, weight, issuance date, organ donor status, and vehicle restriction. However, a business such as a liquor store only needs to verify that the customer is of legal age to buy alcohol. As such, the most the liquor store needs to know is if the customer is over the legal age for this purpose (e.g. over 21). But when a customer presents their driver's license to a liquor store clerk they are revealing a large amount of unneeded personal information. Further, each entity or organization that is used by a user may require different subsets of information to perform an intended action for the entity or organization. Likewise, entities, agencies, or organizations may need derived information, rather than the raw information presented in an identity document. Age verification is an example of derived information, as determining whether a user is older or younger than a certain age may be derived from the user's date of birth and the current date.

Embodiments address these and other problems, individually and collectively.

SUMMARY

Embodiments are directed to methods and systems that can be used to verify identity attributes in an efficient, privacy-preserving manner. An identity attribute refers to information corresponding to the identity of an entity such as a human user. For example, an identity attribute could comprise the age of the user, the user's height, the user's weight, the user's address, the user's date of birth, an account number associated with the user, and/or the like. Identity attributes may be collected or derived from identity documents such as a passport, driver's license, medical insurance card, etc. Identity attributes may also be collected from identity providers. These identity providers may include government agencies such as the Department of Motor Vehicles, the Social Security Administration, etc. Identity providers may also include entities or organizations that have an established relationship with a user, such as a financial institution (e.g., a bank) that has a financial relationship with the user (e.g., maintains a checking account or a credit account on behalf of the user).

In some embodiments, rather than presenting identity documents or identity attributes during an identity verification process, the user can instead present one or more zero-knowledge proofs corresponding to these identity attributes. For example, rather than presenting a driver's license to a liquor store, a user can use a non-interactive zero-knowledge proof (NIZK proof) to prove that the user is of legal age to purchase alcohol. As such, the user is no longer required to present identification documents such as their driver's license, nor does the user need to provide any unneeded personal information to the liquor store. Additionally, the user presents only the minimum amount of information required (i.e., the statement that they are of legal age, rather than a date of birth). As such, the user's privacy is maximally preserved.

The user may possess a user device such as a smartphone. The user device may securely store an "identity token." This identity token may contain identity attributes corresponding to the user, such as the user's date of birth, the user's address, etc. These identity attributes may be cryptographically signed by identity providers (such as a government agencies or issuing banks). The cryptographic signatures may attest that the identity provider has confirmed, verified, or otherwise approved the identity attributes stored in the identity token. The identity token and the identity attributes stored therein may be used by the user device to generate a zero-knowledge proof corresponding to those identity attributes (for example, proving that the user is older than a certain age, proving that the user is younger than a certain age, proving the user lives within a particular region, proving the user possesses an account in good standing, etc.).

Likewise, a relying entity (i.e., an entity performing identity verification, such as a business that sells age restricted products such as alcohol) may possess a relying entity computer. The relying entity computer may store a policy token. The policy token may comprise predicates that indicate the identity information that the relying entity wants or needs to verify. For example, a liquor store computer may possess a policy token with a single predicate corresponding to age verification. A relying entity with more stringent requirements may possess a policy token comprising a larger number of predicates. For example, a car rental agency may possess a policy token comprising an age verification predicate, an auto insurance verification predicate, and an employment status verification predicate. These predicates may be cryptographically signed in order to indicate or prove their authenticity.

Both the identity token and the policy token may have been issued by a token server computer and/or an identity service provider computer (in some embodiments, the token server computer and identity service provider computer may comprise a single computer system). Additionally, the token server computer may have cryptographically signed the policy token in order to indicate that the policy token is legitimate. An identity service provider may operate an identity service provider computer that verifies zero-knowledge proofs generated by user devices.

During an interaction between a relying entity and a user device (for example, a transaction between a merchant and a user, conducted via the user's smart phone), a relying entity computer may transmit its policy token to the user device. The user device may verify the legitimacy of the policy token using the policy token's cryptographic signature. Afterwards, the user device may use the policy token and the user's identity token in order to generate a zero-knowledge proof. The user device may transmit the zero-knowledge proof to an identity service provider computer. The identity service provider computer may verify the zero-knowledge proof. Upon verifying the zero-knowledge proof, the identity service provider computer may generate a verification message that attests the veracity of the zero-knowledge proof. The identity service provider computer may cryptographically sign the verification message and send the verification message to the relying entity computer. The relying entity computer can verify the verification message using the cryptographic signature included with the verification message. Upon verifying the verification message, the relying entity computer can proceed with the interaction with the user device (e.g., a transaction).

For example, a user may be attempting to perform self-checkout at a grocery store. The user may possess a user device such as a smartphone, which may interface with a self-checkout kiosk (relying entity computer) at the grocery store. The self-checkout kiosk may transmit a policy token to the user's smartphone via, for example, near-field communication (NFC) or by displaying a QR-code that can be scanned by the smartphone using a built-in camera. The smartphone may verify the policy token using the cryptographic signature in order to confirm that it was generated by a legitimate identity service provider. This policy token may comprise a single predicate: verifying that the user is of the legal age required to purchase alcohol. The smartphone may use this predicate along with an "age" identity attribute in order to generate a zero-knowledge proof that the user is legally allowed to purchase alcohol. The smartphone may transmit this cryptographic proof to an identity service provider computer over a network such as a cellular network or the Internet.

In some embodiments, he identity service provider computer may verify the zero-knowledge proof by verifying one or more sub-proofs that make up the zero-knowledge proof. The identity service provider computer may verify these sub-proofs using one or more sub-verifiers, each sub-verifier corresponding to a particular zero knowledge proof. Generally, some of the sub-proofs correspond to the predicates, and some of the sub-proofs correspond to the identity attributes themselves. Likewise, some of the sub-verifiers correspond to the predicates, while other sub-verifiers correspond to the identity attributes.

Using the sub-verifiers corresponding to the predicates allows the identity service provider computer to determine if the user meets the requirements defined by the policy token. As an example, this may include verifying that the user is over 21, in order to verify that the user is allowed to purchase alcohol. Using the sub-verifiers corresponding to the identity attributes allows the identity service provider computer to verify that the identity attributes themselves are legitimate. This prevents malicious users from simply generating their own arbitrary identity attributes to trick the identity verification system (e.g., an 18 year old user generating an age identity attribute stating that they are 55). In both cases, the identity service provider computer can execute the sub-verifiers without learning of the user's identity attributes, preserving the user's privacy. Upon verifying the zero-knowledge proof (by verifying all sub-proofs), the identity service provider computer may generate a verification message. The verification message may indicate to the relying entity computer (in this example, the self-checkout kiosk) that the user is legally allowed to purchase alcohol. The identity service provider computer may cryptographically sign the verification message. The identity service provider can subsequently transmit the verification message to the self-checkout kiosk.

The self-checkout kiosk may verify the verification message using the cryptographic signature produced by the identity service provider computer. This indicates to the relying entity that a legitimate identity service provider computer has verified the zero-knowledge proof. Subsequently the self-checkout kiosk can complete the transaction with the user.

As shown by this example, a customer can complete the purchase of an age restricted product (alcohol) without involving a store clerk, without presenting any identity documentation, and while providing the bare minimum amount of information required to verify that they are of legal drinking age. This is an improvement for the user in terms of convenience and privacy.

The use of policy tokens has technical advantages. For example, they preserve the user's privacy, because they enable oversight by the token server computer that issued those policy tokens. The token server computer has no incentive to provide the relying entity computer with more identity information than the relying entity computer requires. Thus, token server computers can issue minimal policy tokens that only contain predicates necessary for meeting the relying entity's verification requirements. This provides for additional privacy and data security for users.

Additionally, conventional zero-knowledge identity verification often involves only two entities: the proving entity (e.g., the customer) and a verifying entity (e.g., the grocery store). As such, they do not provide for system involving a third entity: an identity service provider. The use of an identity service provider and an identity service provider computer greatly reduces system integration burden on relying entities. Relying entities do not need to implement complex cryptographic processes in order to verify zero-knowledge proofs, instead the relying entity merely needs to store a policy token and verify verification messages using basic public-key signature infrastructure. As such, embodiments of the invention have the additional technical advantage of being scalable.

One embodiment is directed to a method comprising: receiving, by a user device, from a relying entity computer, a policy token, wherein the policy token was issued to the relying entity computer from a token server computer; determining, by the user device, based on the policy token and an identity token corresponding to a user, a set of identity attributes from the identity token, wherein the identity token was issued to the user device by the token server computer; and initiating, by the user device, verification of the user using the policy token and the set of identity attributes from the identity token. Another embodiment can include a user device programmed to perform the above method.

Another embodiment is directed to a user device comprising: a processor; and a non-transitory computer readable medium coupled to the processor, the non-transitory computer readable medium comprising code, executable by the processor, for implementing a method comprising: receiving from a relying entity computer, a policy token, wherein the policy token was issued to the relying entity computer from a token server computer, wherein the policy token comprises one or more predicates, wherein each predicate corresponds to one or more identity attributes from an identity token corresponding to a user; determining, based on the policy token and the identity token, a set of identity attributes from the identity token, wherein the identity token was issued to the user device by the token server computer; generating a zero-knowledge proof based on the one or more predicates and the set of identity attributes; and transmitting the zero-knowledge proof to an identity service provider computer, wherein the identity service provider computer verifies the zero-knowledge proof to verify the user.

Another embodiment is directed to a method comprising: providing, by an identity service provider computer, a policy token to a relying entity computer; receiving, by the identity service provider computer, from a user device, a zero-knowledge proof generated at least in part using the policy token and a set of identity attributes stored on the user device; verifying, by the identity service provider computer, the zero-knowledge proof; generating, by the identity service provider computer, based on the verification of the zero-knowledge proof, a verification message; cryptographically signing, by the identity service provider computer, the verification message using a private key corresponding to the identity service provider computer; and transmitting, by the identity service provider computer, to the relying entity computer, the verification message, wherein the relying entity computer thereafter performs an interaction with the user device based on the verification message.

These and other embodiments of the invention are described in further detail below.

Terms

Some descriptions of some terms may be helpful prior to discussing embodiments of the invention.

A "server computer" may include a powerful computer or cluster of computers. For example, the server computer can include a large mainframe, a minicomputer cluster, or a group of servers functioning as a unit. In one example, the server computer can include a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories include one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xenon, and/or XScale; and/or the like processor(s).

A "user" may include any user of some object or service. This may include, for example, a user of a "user device" such as a smartphone, or a user of a payment card (e.g., a credit or debit card). A user may be associated with one or more personal accounts (e.g., payment accounts) or user devices. A user may be referred to as a "cardholder" (when possessing or using a payment card), an account holder (when possessing or using an account), or a consumer (when using goods or services provided by relying entities and resource providers).

A "user device" may include any device transported and/or operated by a user. Examples of user devices include smartphones, PDAs, tablet computers, netbooks, laptop computers, personal music players, hand-held specialized readers, wearable devices (e.g., watches), vehicles (e.g., cars), etc. User devices may provide remote communication capabilities, including communicating over a mobile phone (wireless) network, wireless data network (e.g., 3G, 4G, 5G, or similar networks, Wi-Fi, Wi-Max, or any other communication medium that may provide access to a network such as the Internet or a private network. A mobile device may comprise any suitable hardware and software for performing such functions, and may also include multiple devices or components (e.g., when a device uses another device as a relay to gain remote access to a network, both devices taken together may be considered a single user device). A user device may comprise a biometric interface, and may capture biometric samples via the biometric interface. A user device may comprise a memory element, and may store data, such as biometric templates, on the memory element.

A "relying entity" may include an entity that may receive assertions (e.g., verification messages), digital identification (DI), and/or identity attributes. A relying entity may receive these data in order to verify that a user is authorized or allowed to acquire a particular resource or use a particular service. For example, the relying entity may comprise a bar that needs to determine whether a user is legally allowed to purchase alcohol. A relying entity may be a "resource provider," i.e., an organization that provides resources (including goods, services, and access) to users. Resource providers include businesses, governments, non-government organizations, and the like. A relying entity may operate a relying entity computer, a computer system that performs operations on behalf of the relying entity. For example, a relying entity computer may receive and analyze verification messages on behalf of the relying entity.

A "merchant category code" (or MCC) may include data used to categorize or classify a business. A merchant category code may comprise a four digit number listed in the ISO 18245 standard. Examples of merchant category codes include "1731" (electrical contractors), "5309" (duty free stores), and "5169" (commercial footwear).

An "issuer," "issuing entity" or "authorizing entity" may include an entity that can authorize or approve interactions. These interactions may include transactions between users and relying entities or resource providers. An issuer may comprise a business entity (e.g., a bank) that maintains an account for a user, and is capable of authorizing interactions such as payment transactions. An issuer may have "issued" a payment credential to a user, such as a credit card or debit card. An issuer may possess identity information or identity attributes corresponding to a user, and may act as an "identity provider." An issuer may operate an "issuer computer," a computer system that is operated by the issuer.

An "identity provider" may include any entity that provides identity information or identity attributes. Examples of identity providers include government agencies (such as the Social Security Administration, the Department of Motor Vehicles (DMV), etc.), businesses, and issuers. An identity provider may have an established relationship with a user. For example, the DMV may have issued a driver's license to a user. The identity provider may possess identity information or identity attributes because of this established relationship, e.g., the DMV may possess identity information or identity attributes because the user provided the DMV with identification documents (such as a birth certificate) when the user registered for a driver's license. An identity provider computer may comprise a computer system that is operated by the identity provider.

A "cryptographic key" may include data used in encryption or decryption. For example, a cryptographic key may refer to a product of two large prime numbers. A cryptographic key may be used in a cryptosystem such as RSA (Rivest, Shamir, Adelman) or AES (Advanced Encryption Standard), and may be used to encrypt plaintext and produce a ciphertext output, or decrypt ciphertext and produce a plaintext output. Cryptographic keys may be symmetrical, in which case the same key is used for encryption and decryption, or asymmetrical, in which case different keys are used for encryption and decryption.

an "asymmetric key pair" or "public-private key pair" may include two cryptographic keys used to encrypt and decrypt data. These cryptographic keys may comprise a "public key" and a "private key" or "secret key." Typically, an entity may distribute or publish the public key, and keep the private key secret. The entity can use the private key to decrypt messages encrypted with the public key, in order to decrypt encrypted communications from other entities. Public-private key pairs may also be used to implement cryptographic signature schemes.

A "signature," "digital signature," or "cryptographic signature" include encrypted data used to verify the authenticity of other data using cryptography. An entity may digitally sign data by encrypting that data using a cryptographic key known only to that computer (i.e., a private key). Other computers may verify the signature by decrypting the data using a publically known cryptographic key corresponding to that computer (i.e., a public key). A Camenisch-Lysyanskaya signature is an example of a cryptographic signature that can be used to implement anonymous credential systems.

"Plaintext" may include text or data that is in unencrypted or plain form. For example, this may include text that can be interpreted by a human or a computer without any processing, such as the phrase "hello, how are you?" Numbers or other symbols may also qualify as plaintext.

A "ciphertext" or "cryptogram" may include any text or data that is in encrypted form. For example, this could refer to text that must be decrypted before it can be interpreted by a human or computer. Ciphertext may be generated using any cryptographic algorithm or cryptosystem, such as RSA or AES.

A "secret value" or "secret" may include any value or thing kept hidden as part of a cryptographic process. The security of the cryptographic process may rely on the secret value remaining secret. Examples of secrets include cryptographic keys and secret random numbers. A "master secret" may refer to a secret from which other secret values or cryptographic values may be derived.

A "commitment" or "commitment message" include any data that may be used to verify that a course of action has been committed to. In the context of cryptography, a commitment may refer to data that may that may be used to verify that encrypted data has not been modified or tampered with. Before data is encrypted, a commitment can be produced based on the data, e.g., via a hash function. When and if the data is decrypted, the decrypting entity can use the decrypted data to produce a second commitment and compare the second commitment to the original commitment to verify that the data has not been modified.

In a cryptographic context, a "pseudonym" may comprise a randomized commitment to a master secret. A pseudonym can serve as a substitute for a public-key used in traditional public key infrastructure. A pseudonym can be used by a user to establish a relationship with an entity. As an example, a user may want an entity (such as a relying entity) to recognize the user as a returning user (e.g., a repeat customer). A user can generate an unlimited number of pseudonyms based on a master secret, allowing the user to establish relationships with each of those entities, without those relationships or the pseudonyms being linkable to one another.

A "random nonce" or "cryptographic nonce" may include to a random value (e.g., a random number) that may be used in cryptographic processes, preferably a limited number of times. A random nonce may be randomly or pseudo-randomly generated, and may be used in conjunction with cryptographic hash functions. A random nonce may prevent some cryptographic attacks, such as "replay attacks."

"Verifiable computation" may include computational processes with results that can be verified. For example, a computer system may offload or outsource the execution of a function to another computer system, using verifiable computation to verify that the other computer system is executing the function correctly. Verifiable computation may include "verifiable cryptography," which may enable a computer system to verify that data was encrypted or decrypted correctly. Verifiable computation and verifiable cryptography may form the basis of a cryptographic proof system, including zero-knowledge proofs.

A "zero-knowledge proof" may include data that proves something without conveying any additional knowledge about that thing. For example, a zero-knowledge proof may prove that a novella is over 20,000 words long, without conveying the specific length of the novella or the novella's contents. A zero-knowledge proof may be generated by a "prover" and verified by a "verifier" in a process known as "proof verification." Verifiable computation may be used by the verifier to verify the zero-knowledge proof, that is, the verifier may verify that the proof was generated correctly, without needing to evaluate the data used to generate the proof (e.g., the novella).

The term "identifier" include any information that may be used to identify something. In some embodiments, the identifier may be a special value generated randomly or according to a predetermined algorithm, code, or shared secret. For example, an individual may be identified using a driver's license number or a cryptographic key. As another example, a computer may be identified by a MAC address, IP address, or the like.

An "identity attribute" may include a particular piece of information about an entity (e.g., a person, organization, thing, or the like). Examples of identity attributes include a social security number, an age, a phone number, and a bank account number associated with a person.

A "digital identity" (DI) may include a secure set of information about an entity (e.g., a person, organization, or thing). A DI may comprise a plurality of identity attributes, as well as a digital identity identifier that identifies the digital identity. For example, a DI for a user, Joe Smith, may include identity attributes such as the user's date of birth, social security number, address, and driver's license number, as well as an identifier such as "Joe_Smith_1234" that is used to identify Joe Smith's digital identity. The DI may be made available to another entity in a secure manner. An identity token may be an example of a DI.

The term "identification document" or "physical identification" may include a document or other object used to identify an entity. Examples of identification documents include birth certificates, driver's licenses, library cards, and other forms of identification. Identification attributes, or information that may be associated with identification attributes, may be printed on identity documents, or otherwise indicated by those documents. For example, a "date of birth" identity attribute may be printed on a birth certificate or driver's license.

The term "uniform resource identifier" or "URI" may refer to data (such as a string of characters) that unambiguously identifies a particular resource. An example of a URI is a web address (more specifically, a uniform resource locator or URL). Resources can include objects (such as computers or devices) as well as data (such as web pages or data stored on a memory element).

A "credential" may include any suitable information that serves as evidence of identity, authority, ownership, or worth. Credentials may include objects (such as an identification badge or certified document) or data (such as a payment account number or PAN, a passcode, an identification badge number, etc.). Tokens, such as identity tokens or payment tokens can also serve as credentials.

An "identity token" may include data that serves as a substitute for traditional identity documents. An identity token may be used to identify or authenticate a user in place of such traditional documents. For example, a user may present an identity token to another user in order to verify their identity, rather than presenting a driver's license or passport. Identity tokens may comprise identity attributes, which may correspond in some way to the user's identity. For example, an identity token may comprise an identity attribute corresponding to the user's age. Identity tokens may be electronically transferable and storable.

A "policy token" may include data that serves as a substitute for a policy or regulation. For example, a liquor store may have a store policy that they do not sell alcohol to anyone under 21. A policy token may serve as a digital substitute for this policy. Policy tokens may be used to automatically enact the policies that they substitute. For example, a policy token may be used by one or more computer systems to verify that a user is over 21, when traditionally a human store clerk or attendant would enact this verification policy. A policy token may comprise one or more predicates.

A "predicate" may include any data that is used as the basis for other data. For example, a predicate may form the basis for a zero-knowledge proof, in that the zero-knowledge proof is generated based on the predicate or its contents. A predicate can correspond to a query, such as "is User A over 21 years old?" An entity can generate a zero-knowledge proof based on this predicate, which proves "Yes, User A is over 21 years old." Predicates can be stored in a policy token, and one or more predicates can be used to implement a policy, such as an age verification policy for a liquor store.

A "payment token" may include data that serves as a substitute for an account identifier, such as a payment account number (PAN). For example, a token may include a series of alphanumeric characters that may be used as a substitute for an original account identifier. As an example, a payment token such as "4900 0000 0000 0001" may be used in place of a PAN "4147 0900 0000 1234." A payment token may be "format preserving" and may have a numeric format that confirms to the account identifier (PAN) used in existing transaction processing networks (e.g., the ISO 8583 financial transaction message format). In some embodiments, a token may be used in place of a PAN to initiate, authorize, settle, or resolve a payment transaction, or otherwise represent the original credential in other systems where the original credential would typically be provided. A payment token may be constructed such that it is not possible to recover the original PAN or account identifier from the payment token. Further, a payment token may be configured to allow the entity receiving the payment token to recognize it as a payment token.

A "biometric interface" may include an interface through which biometric samples or instances can be collected. Examples of biometric samples include fingerprint scanners (used to capture fingerprint patterns), cameras (used to capture iris or retina scans), and microphones (used to capture voice recordings), among others. Some devices may be used as biometric interfaces in addition to their non-biometric functions. For example, the microphone embedded into a phone may be used to capture voice recordings, in addition to enabling a user to talk to others over the phone.

A "biometric template" may include information relating to a biological observation. Biometric templates may include digital references (e.g., data or data files) of distinct characteristics that have been extracted from a biometric sample (or biometric instance). Examples of distinct characteristics include fingerprint ridge patterns (i.e., arches, loops, whorls, etc.). Biometric templates may be used in biometric authentication processes. A biometric template may be compared against a captured biometric instance in order to authenticate a user. For example, a biometric template corresponding to a user may be stored on the user's smartphone. In order to unlock the smartphone, the user may press their thumb against a biometric interface. The biometric interface may collect a biometric sample that can be compared against the biometric template in order to authenticate the user.

An "identity document validation service" may refer to a service that can validate identity documents or the information presented in identity documents. For example, an identity document validation service may verify that the information presented in a passport is accurate.

A "user data validation service" may refer to a service that can validate identity data (such as identity attributes provided by users. As an example, a user data validation service may be used to verify that a date of birth, presented by a user is the user's actual date of birth. Background checks are an example of a user data validation service.

An "assertion" (sometimes referred to as an "assertion value") may refer to a secure fact about an entity. An assertion can protect information while being useful to achieve a particular goal. For example, an assertion may specify something about an entity, such as whether the entity should be allowed to purchase alcohol in a particular location. This assertion may be "Jane Doe is old enough to purchase alcohol in California." This assertion can be used by a bar in its decision to serve alcohol to Jane Doe. An assertion may be used in place of other information or identity documents. For example, an assertion may be provided to a bar instead of a driver's license, which is conventionally used to prove a person's age.

A "type of assertion" may be a category of assertions, e.g., whether an entity has at least $100 in a bank account. The "assertion" or "assertion value" associated with the type of assertion may comprise a statement corresponding to the type of assertion. For example, the statements "yes" or "no" may correspond to the type of assertion "does Jane Doe have $100 or more in her bank account?" An assertion may be cryptographically secure, and may be cryptographically signed by an interested party (e.g., a user device) and/or a trusted party.

DETAILED DESCRIPTION

As stated above, some embodiments are directed to methods and systems for verifying identity attributes associated with users of user devices. In some embodiments, an identity service provider computer verifies the identity attributes using zero-knowledge proofs, rather than verifying the identity attributes directly. In doing so, embodiments preserve the privacy of users, who may wish to verify their identity or identity attributes, without disclosing sensitive personal information.

It is assumed that a person of skill in the art of cryptography understands the fundamentals of zero-knowledge proofs. As such, they are not described in detail herein. Zero-knowledge proofs may be better understood with reference to the following papers: [1] Parno, Gentry, Howell, and Raykova "Pinocchio: Nearly Practical Verifiable Computation," Cryptology ePrint Archive, Report 2013/279, 2013. [2] Ben-Sasson, Chiesa, Tromer, and Virza "Succinct Non-Interactive Zero-knowledge for a von Neumann Architecture" Cryptology ePrint Archive, Report 2013/879, 2013. [3] Gennaro, Gentry, Parno, and Raykova "Quadratic Span Programs and Succinct NIZKs without PCPs," in EUROCRYPT, 2013. Originally Published as Cryptology ePrint Archive, Report 2012/215, and [4] IBM Research—Zurich "Specification of the Identity Mixer Cryptographic Library" IBM, 2010.

Generally, a zero-knowledge proof proves a statement about something without disclosing any additional information about that thing. For example, a zero-knowledge proof could be used to prove that a book is over 10,000 words long without disclosing either the contents of the book (i.e., the chapters, paragraphs, sentences, etc. that make up the book) or its actual length. As another example, a zero-knowledge proof could be used to prove that a user has successfully solved a puzzle (such as Sudoku or a crossword) without revealing the actual solution to the puzzle (e.g., the configuration of numbers in the Sudoku or the words in the crossword).

In some embodiments, zero-knowledge proofs are used to prove statements about identity attributes without disclosing those identity attributes. For example, a zero-knowledge proof can be used to prove that a user is older than a certain age (for example, 21) without disclosing the user's actual age (for example, 45) or the user's date of birth. As another example, a zero-knowledge proof can be used to prove that a user lives within a particular geographic region (e.g., the state of California) without disclosing the user's address or any other identifying information.

Figure 1:
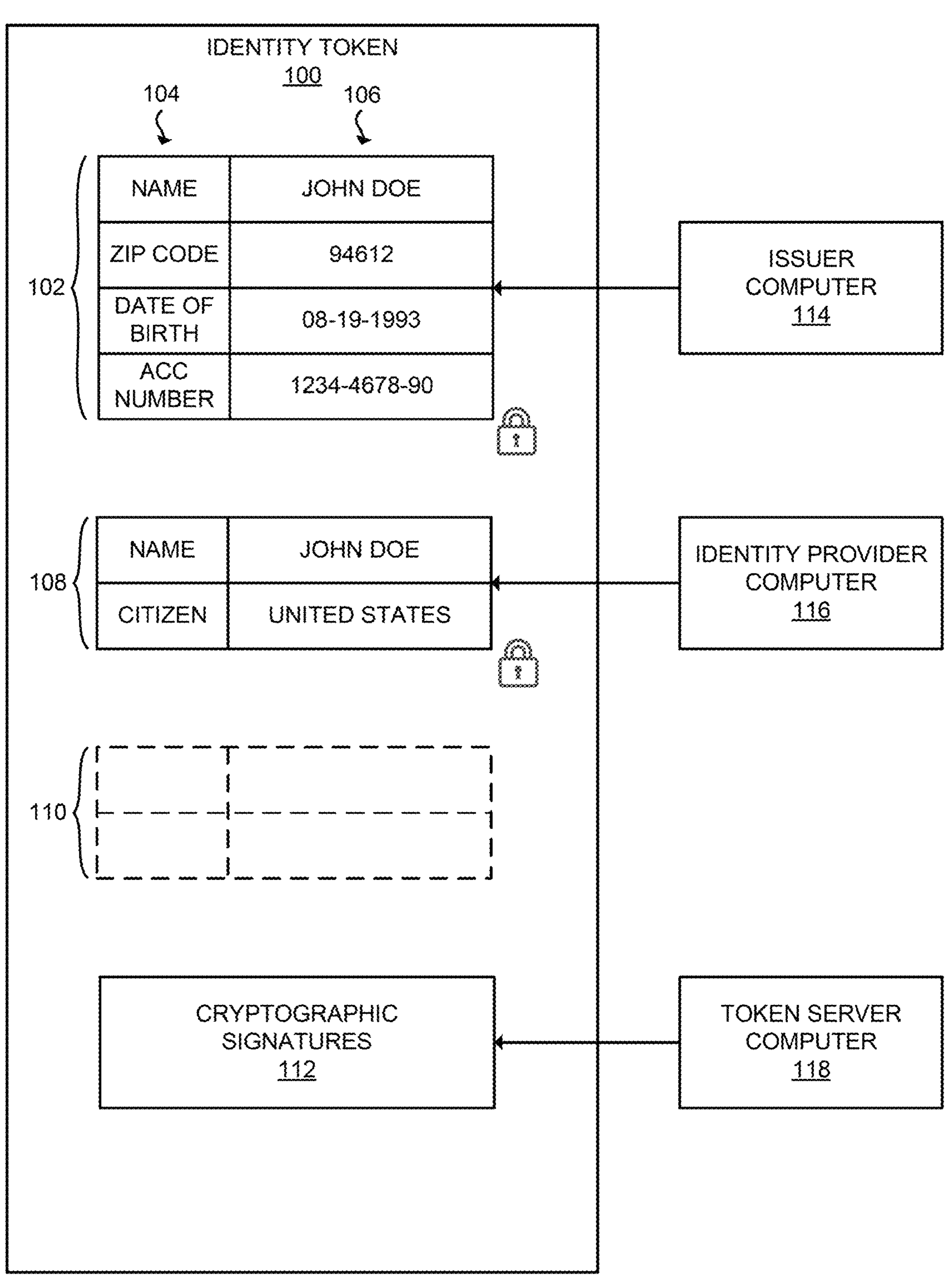
FIG. 1 shows a block diagram of an exemplary identity token according to some embodiments.

Identity attributes may be compiled in an identity token, a data element that may be stored on a user's "user device" (for example, a smartphone, laptop, personal computer, tablet, wearable device, etc.). FIG. 1 shows an exemplary identity token 100 according to some embodiments. Identity token 100 comprises sets of identity attributes 102 and 108. Each identity attribute in each set of identity attributes comprises an identity attribute label and an identity attribute value. For example, the set of identity attributes 102 comprises identity attribute labels 104 (i.e., Name, Zip Code, Date of Birth, Account Number) and identity attribute values 106 (i.e., John Doe, 94612, Aug. 19, 1993, 1234-4678-90). Each set of identity attributes 102 and 108 may be encrypted and cryptographically signed. Alternatively or additionally, each individual identity attribute (for example, the identity attribute corresponding to the user's name) may be encrypted and cryptographically signed. The identity attributes may be encrypted in order to prevent identity thieves or other fraudsters from acquiring them.

The sets of identity attributes 102 and 108 that populate identity token 100 may be provided by identity providers. Generically, the term identity providers may refer to an entity that provides identity attributes. One example of an identity provider is a government agency such as a Department of Motor Vehicles (DMV). The DMV may be able to provide the identity attributes in the identity token because it had previously received identity information from the user. For example, the user may have provided identity information to the DMV when the user registered for a driver's license. Another example of an identity provider is an issuing bank. The issuing bank may have an established financial relationship with the user. For example, the issuing bank may maintain a credit or checking account on behalf of the user. In order to establish this financial relationship, the user may have previously provided identity information (i.e., identity attributes) to the issuing bank. A third example of an identity provider is a university that issues identity documents (i.e., diplomas) to current and former students of the university. Like the DMV or an issuing bank, a university can also provide identity attributes or sets of identity attributes uses to populate identity token 100.

As shown in FIG. 1, set of identity attributes 102 originated from issuer computer 114, while the set of identity attributes 108 originated from identity provider computer 116. Because an issuer is a specific instance of an identity provider, an issuer computer is a specific instance of an identity provider computer.

Identity token 100 may also comprise one or more empty sets of identity attributes 110. These empty sets of identity attributes 110 may be "filled" at a later time by another identity provider or alternatively, by the user themselves. In this way additional identity attributes may be periodically added to the identity token 100. This may be useful if the user's identity attributes change over time (e.g., the user moves to a different zip code, changes their citizenship status, changes their name, etc.).

As stated above, the sets of identity attributes 102 and 108, or the identity attributes that make up the sets can be cryptographically signed. These identity attributes may be cryptographically signed by the identity provider (for example, issuer computer 114 or identity provider computer 116) that provided the corresponding identity attributes. These cryptographic signatures indicate that the identity attributes originated from a known, reputable identity provider. As an example, if identity provider computer 116 comprises a computer system associated with the DMV, the identity attributes in the set of identity attributes 108 (i.e., the name "John Doe" and United States citizenship) are signed using a cryptographic key corresponding to the DMV. In some embodiments, Camenisch-Lysyanskaya (CL) signatures are used. These CL signatures may be desirable because they can be integrated efficiently into zero-knowledge proof systems.

Additionally, identity token 100 may comprise a cryptographic signature 112 produced by token server computer 118. This cryptographic signature 112 may indicate that identity token 100 is a legitimate identity token that was issued by token server computer 118. Token server computer 118 may comprise a computer system that generates and provisions identity tokens (such as identity token 100) to user devices. The user device or another computer system can use cryptographic signature 112 to verify that the identity token was issued by token server computer 118 (e.g., by decrypting cryptographic signature 112 using a public key corresponding to token server computer 118).

In some embodiments, the identity attributes stored in identity token 100 may be used by the user device to generate zero-knowledge proofs corresponding to those identity attributes. The zero-knowledge proofs may be transmitted to an identity service provider computer. The identity service provider computer verifies the zero-knowledge proofs in order to verify the identity attributes. In this process, the identity attributes themselves are not disclosed to the identity service provider computer, preserving the user's privacy. In addition to the identity token 100, the user device may use a policy token, received from a relying entity computer, in order to generate zero-knowledge proofs.

A policy token may be issued by token server computer (for example, token server computer 118 from FIG. 1) to a relying entity. A relying entity may comprise an entity that needs to verify one or more of the user's identity attributes. For example, a relying entity may comprise a liquor store, which is legally required to verify that a customer can legally drink. During an interaction (for example, a transaction) with a customer, a relying entity computer (for example, a computer system associated with a liquor store) may transmit a policy token to a user device associated with the customer. The user device may use the policy token and an identity token stored on the user device to generate a zero-knowledge proof. This zero-knowledge proof may prove that the user is above the drinking age and may do so without disclosing the user's age or date of birth.

Figure 2:
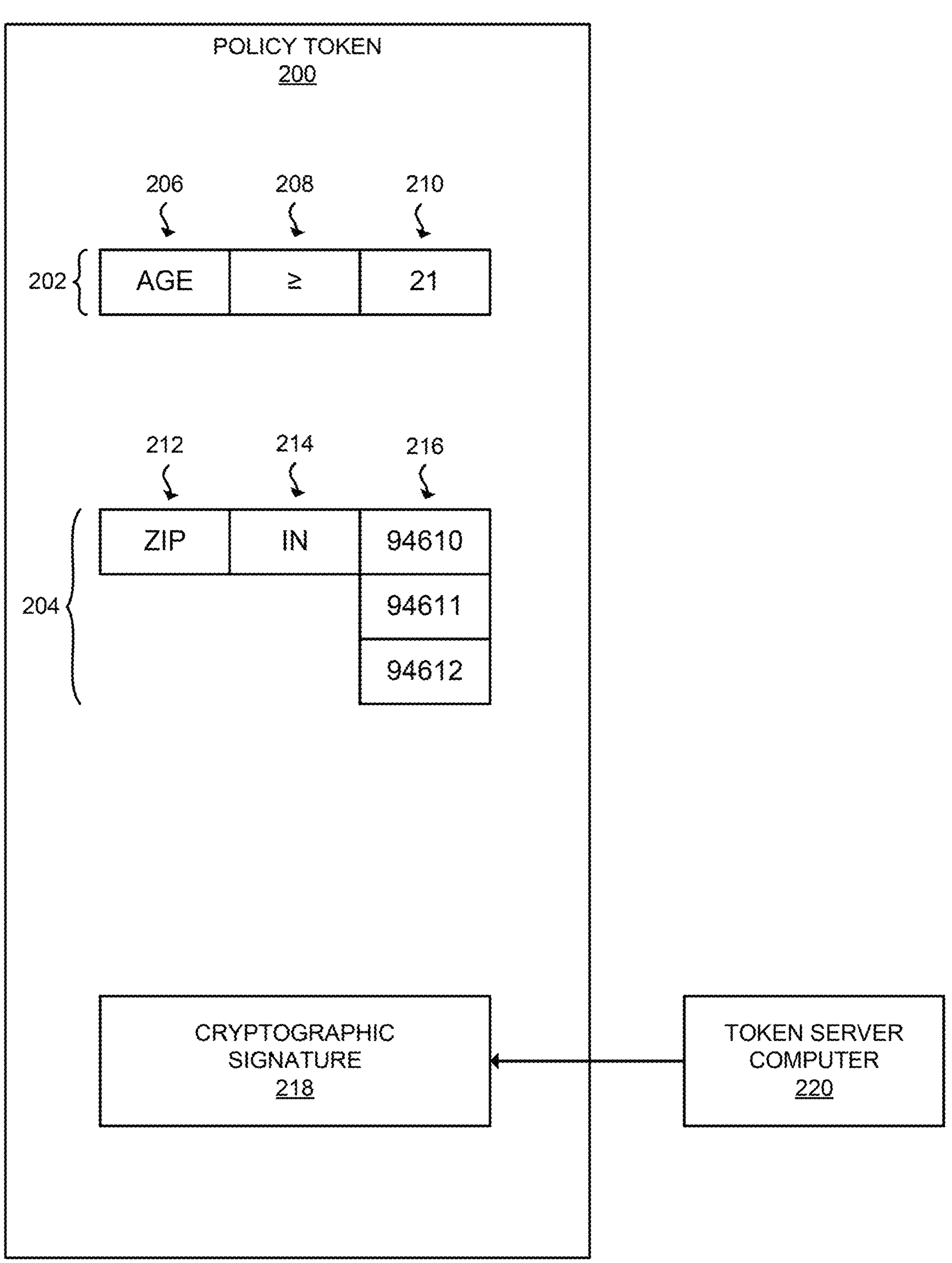
FIG. 2 shows a block diagram of an exemplary policy token according to some embodiments.

FIG. 2 shows an exemplary policy token 200 according to some embodiments. The policy token 200 can be stored on a relying entity computer. The policy token 200 comprises one or more predicates, including predicate 202 and predicate 204. The policy token 200 may be cryptographically signed (see cryptographic signature 218) using a private key corresponding to the token server computer 220. Token server computer 220 may have generated and issued the policy token 200 to a relying entity computer. Entities and computer systems such as the relying entity computer or a user device may use the cryptographic signature to verify the legitimacy of the policy token. For example, a user device can verify that the policy token was generated by a legitimate token server computer (e.g., token server computer 220) using a public key corresponding to cryptographic signature 218.

Each predicate of the one or more predicates may comprise multiple parts. These parts may include one or more target identity attribute, such as target identity attribute 206 and target identity attribute 212. Each of these predicates may correspond to one or more identity attributes from sets of identity attributes stored in an identity token (e.g., the identity attribute designated by the target identity attribute). Each predicate may also comprise a comparison function such as comparison function 208 or comparison function 214. Additionally, each predicate may comprise one or more comparison values, such as comparison value 210 and comparison values 216. These predicates may be used by the user device to generate zero-knowledge proofs.

Target identity attributes, such as Target identity attribute 206 and Target identity attribute 212 indicate to the user device which identity attributes should be used to generate zero-knowledge proof. For example, Target identity attribute 206 indicates that the user's age should be used to generate a zero-knowledge proof, while Target identity attribute 212 indicates that the user ZIP Code should be used to generate a zero-knowledge proof.

Comparison functions, such as comparison function 208 and comparison function 214, indicate one or more characteristics of the identity attribute that should be proven by the zero-knowledge proof. For example, comparison function 208 is an inequality function. Predicate 202 thus indicates that a user device should generate a zero-knowledge proof that proves that the user's age (target identity attribute 206) is greater than 21 (comparison value 210).

Comparison function 214 is an example of a set membership function. A set membership function determines whether a value belongs to a set of comparison values, such as comparison values 216. In exemplary policy token 200, predicate 204 indicates that a user device should generating a zero-knowledge proof proving that the user's ZIP code identity attribute is within the set of ZIP codes comprising 94610, 94611, and 94612.

As indicated in FIG. 2, comparison functions can comprise inequality functions and set membership functions.

However, it should be understood that other comparison functions may be used in embodiments of the invention, including mathematical functions (e.g., addition, subtraction, multiplication, division, integration, etc.), arbitrary Boolean functions (e.g., NOT, AND, OR, NOR, NAND, XOR, XNOR, and any combination thereof), and the like.

Notably, in some embodiments the predicates included in the policy token may be chosen at the discretion of the token server computer 200. The relying entity may request or otherwise indicate its desired predicates to token server computer 220, but ultimately the token server computer 220 decides which predicates to issue to the relying entity. In this way, the token server computer 220 protects the user's privacy, as a token server computer 220 may choose not to issue predicates that are needlessly invasive. For example, a relying entity liquor store may need to verify that a customer's age is over 21 (the legal drinking age in the state or territory where the liquor store is located). However, the relying entity is under no legal obligation to verify the user's home address. Conceivably, the relying entity may desire this information because the relying entity wants to mail promotional material and other advertisements to the users address. However, because the relying entity does not need this information, the token server computer 220 may choose not to issue a policy token containing a predicate corresponding to the user's address. The relying entity may provide additional information which may be used by the token server computer 220 to determine appropriate predicates and generate the policy token 200. For example, the relying entity computer may provide a merchant category code (MCC). For business relying entities, a merchant category code indicates the types of goods or services that the relying entity provides. A merchant category code may be used to infer the identity verification requirements of the relying entity, and thus may be used to determine the predicates that should be issued to the relying entity computer in policy token 200.

As stated above, a user device may use a policy token such as policy token 200 to generate a zero-knowledge proof. This zero-knowledge proof may correspond to the predicates stored in a policy token, such as policy token 200 (e.g., predicate 202 and predicate 204). The zero-knowledge proof may comprise one or more sub-proofs. Each sub-proof may correspond to a predicate of the one or more predicates. For example, a first sub-proof may correspond to predicate 202 and a second sub-proof may correspond to predicate 204. In some embodiments, each sub-proof corresponding to each predicate indicates the output of a corresponding comparison function (e.g., comparison function 208 and comparison function 214) with inputs comprising the one or more comparison values (e.g., comparison value 210 and comparison values 216) and one or more identity attribute values corresponding to the one or more target identity attributes (e.g. target identity attribute 206 and target identity attribute 212). For exemplary policy token 200, the first sub-proof may comprise a zero-knowledge proof that the user's age is greater than 21 and the second sub-proof may comprise a zero-knowledge proof that the user ZIP Code is 94610, 94611, or 94612. These sub-proofs, along with any other sub-proofs, may be combined into a single zero-knowledge proof. Examples of other sub-proofs may comprise sub-proofs based on additional predicates (not shown in exemplary policy token 200) as well as sub-proofs corresponding directly to the identity attributes themselves. For example, the zero-knowledge proof may comprise a sub-proof that proves that the user's age identity attribute and/or ZIP code identity attribute is legitimate, by proving that the CL signature corresponding to the age identity attribute and/or ZIP code identity attributes corresponds to a legitimate identity provider.

Figure 3:
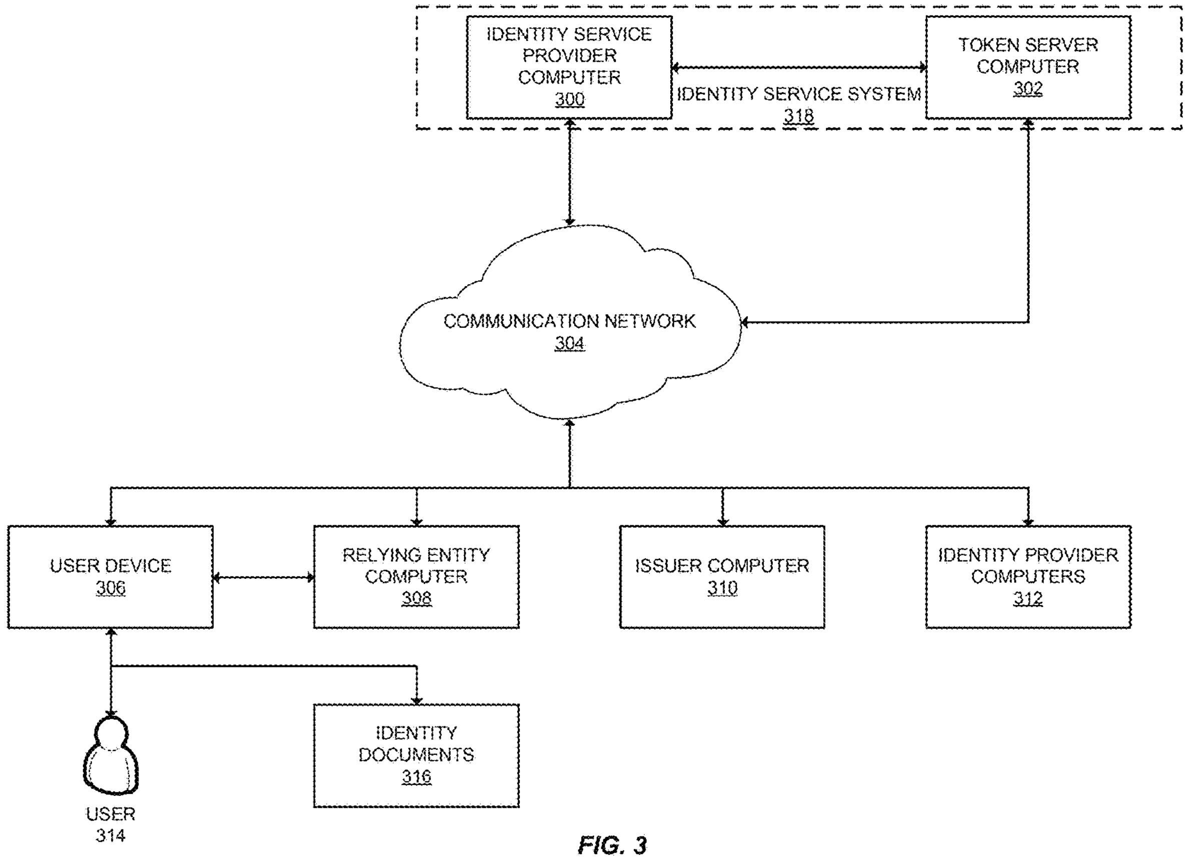
FIG. 3 shows a system block diagram of an exemplary identity service system according to some embodiments.

Having described identity tokens and policy tokens in some detail, it is now appropriate to describe a system according to some embodiments. FIG. 3 shows a system block diagram of an exemplary system according to some embodiments. The exemplary system comprises identity service provider computer 300, token server computer 302, communication network 304, user device 306, relying entity computer 308, issuer computer 310, identity provider computers 312, user 314, and identity documents 316. Identity service provider computer 300 and token server computer 302 may comprise a single identity service system 318.

The computers and devices of FIG. 3 may communicated with each other via communication network 304, which can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers and devices may be transmitted using a secure communications protocol, such as, but not limited to, File Transfer Protocol (FTP); HyperText Transfer Protocol (HTTP); Secure HyperText Transfer Protocol (HTTPS); Secure Socket Layer (SSL), ISO (e.g., ISO 8583) and/or the like.

Identity service provider computer 300 may comprise a computer system that verifies zero-knowledge proofs in order to verify identity attributes corresponding to user 314. Identity service provider computer 300 may communicate with other devices and computers in the system via communication network 304. These communications may include receiving zero-knowledge proofs comprising one or more sub-proofs from user device 306, as well as transmitting verification messages to relying entity computers, such as relying entity computer 308. Generally, a verification message indicates whether or not a zero-knowledge proof was verified correctly. For example, user device 306 may generate a zero-knowledge proof that proves or purports to prove that user 314 is older than 55 years old (e.g., in order for user 314 to prove that they qualify for a senior citizen discount). Upon verifying the zero-knowledge proof, identity service provider computer 300 may generate a verification message. The verification message may indicate to the relying entity computer 308 that the zero-knowledge proof verified correctly, and thus user 314 is over 55 years old. Alternatively, if user 314 is not over 55 years old, the verification message may indicate that user 314 is not over 55 years old, that the zero-knowledge proof failed to verify, or a combination thereof. Identity service provider computer 300 is described in more detail below with reference to FIG. 5.

Token server computer 302 may comprise a computer system that generates and distributes identity tokens to user devices such as user device 306. Additionally, token server computer 302 may generate and distribute policy tokens to relying entity computers such as relying entity computer 308. Token server computer 302 may communicate with user device 306, relying entity computer 308, issuer computer 310, and identity provider computers 312 via communication network 304. These communications may include, for example, receiving identity attributes from issuer computer 310 and identity provider computers 312, as well as transmitting identity tokens and policy tokens to user device 306 and relying entity computer 308 respectively. Token server computer 302 may compile identity attributes received from issuer computer 310 and identity provider computers 312 into the identity token transmitted to user device 306. In some embodiments, token server computer 302 may mediate communication between identity provider computers 312, issuer computers 310, and user device 306 in order to generate an identity token for user device 306.

In some embodiments, identity service provider computer 300 and token server computer 302 comprise a single identity service system 318. This identity service system 318 may comprise a single computer system or entity. The term identity service provider computer may refer to this single computer entity, that is, a single computer entity performing the functions of both identity service provider computer 300 and token server computer 302. For example, the identity service provider computer of FIG. 5 possesses software modules that enable it to perform token server computer functionalities.

User device 306 may comprise any computer system that is operated by user 314. In some embodiments, user device 306 may comprise a smartphone, tablet, laptop, or wearable device such as a smart watch. User device 306 may also comprise a personal desktop computer, a videogame console, a smart TV, or the like. User device 306 may possess a memory element, such as a non-transitory computer readable medium that stores one or more identity token corresponding to user 314. Additionally, the memory element may store software modules, comprising code, which may be executed by a processor in order to perform some methods according to some embodiments, such as the generation of zero-knowledge proofs. User device 306 may also possess a communication interface that enables user device 306 to communicate with relying entity computer 308 and other computer systems directly, or via communication network 304. For example, the communication interface can include a near-field communication interface that enables transmission of data between a relying entity computer 308 and user device 306, as well as a network interface (such as a cell phone or Wi-Fi antenna) that enables user device to communicate over communication network 304. Additionally, user device 306 may comprise a biometric interface that enables the capture of biometric information from user 314. This may comprise, for example, a camera that can be used to take a picture of the user's face (e.g., "a selfie") or a picture of the user's eye. User devices such as user device 306 are described in more detail below with reference to FIG. 4.

Relying entity computer 308 may comprise computer system associated with a relying entity. A relying entity may comprise an entity or organization that wants or needs to verify identity attributes corresponding to users (such as user 314). For example, relying entity computer 308 may be a computer system associated with a liquor store that wants to verify that the user 314 is old enough to purchase alcohol. Alternatively, relying entity computer 308 may comprise a computer system associated with a security company employed to guard or otherwise control access to a building. The security company may wish to verify the user 314 identity attributes in order to verify that the user 314 should be granted access to the building (e.g., verify that the user's 314 name identity attribute is a member of a set of allowed user names). The relying entity computer 308 may possess a policy token and may provide the policy token to user device 306 (via for example a near-field communication interface, or a QR code) so that user device 306 can generate a zero-knowledge proof in order to verify their identity attributes. The relying entity computer 308 may have received the policy token from token server computer 302 during a token provisioning process.

Issuer computer 310 may comprise a computer system associated with an issuing bank. The issuing bank may have an existing financial relationship with user 314 (e.g., the issuing bank manages a checking or savings account for user 314). As such the issuing bank may possess identity information corresponding to user 314. The issuer computer 310 may provide this identity information in the form of identity attributes to user device 306 or token server computer 302 during an identity token provisioning process.

Identity provider computers 312 may comprise computer systems associated with any appropriate identity providers. For example, these may comprise computer systems associated with government agencies (such as the Department of Motor Vehicles or the Office of Vital Statistics, the Social Security Administration, the Unique Identification Authority of India (UIDAI), etc.). Like issuer computer 310, identity provider computers 312 may provide identity attributes the user device 306 or token server computer 302 during an identity token provisioning process. An issue computer may be considered an identity provider computer.

User 314 may comprise any user of user device 306. Particularly, user 314 may comprise a human user that consumes some good, service, resource, or access provided by the relying entity associated with relying entity computer 308. Further, user 314 may possess a set of identity documents 316. Identity documents 316 may include any documents that include or state identity information or attributes corresponding to user 314. For example, identity documents 316 may include a driver's license, a birth certificate, a Social Security card, a selective service card, a medical insurance card, a library card, and/or the like. Identity information may be extracted from identity documents 316 via user device 306. For example user 314 may use user device 306 to scan or take a picture of an identity document (using for example a camera integrated into user device 306. Subsequently, user device 306 can extract identity attributes from the image of the identity documents (for example, using optical character recognition). These extracted identity attributes may be used to populate sets of identity attributes in an identity token issued to user device 306.

Figure 4:
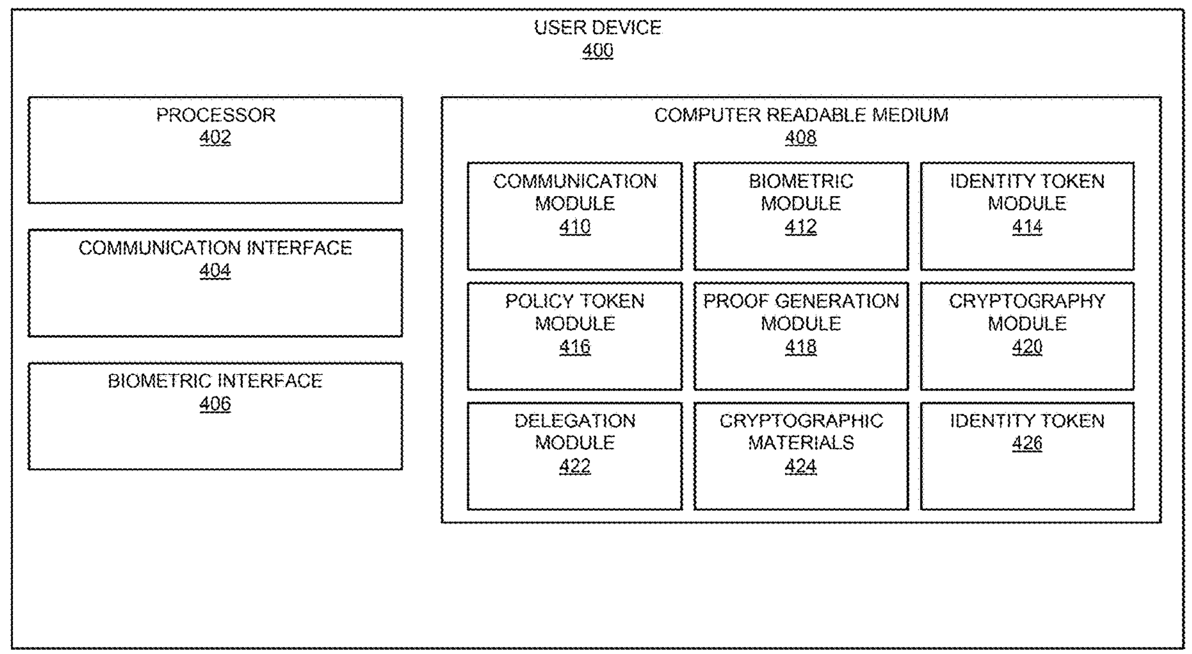
FIG. 4 shows a block diagram of an exemplary user device according to some embodiments.

An exemplary user device 400 will now be described in more detail with reference to FIG. 4. The user device 400 may comprise a processor 402, a communication interface 404, a biometric interface 406, and a computer readable medium 408.

Processor 402 may comprise any suitable data computation device or devices. Processor 402 may be able to interpret code and carry out instructions stored on computer readable medium 408. Processor 402 may comprise a Central Processing Unit (CPU) operating on a reduced instructional set, and may comprise a single or multi-core processor. Processor 402 may also include an Arithmetic Logic Unit (ALU) and a cache memory.

Communication interface 404 may comprise any interface by which user device 400 may communicate with other computers or devices. Examples of communication interfaces include: wired interfaces, such as USB, Ethernet, or FireWire, as well as wireless interfaces such as a Bluetooth or Wi-Fi receivers. User device 400 may possess multiple communication interfaces 404. As an example, a smartphone user device 400 may communicate through a micro USB port, a cellular receiver, a Bluetooth receiver, and a Wi-Fi receiver.

User device 400 may communicate with other devices or computers using communication interface 404, via one or more secure and authenticated point-to-point channels. These channels may use a standard public key infrastructure. For example, user device 400 and an identity service provider computer may exchange a symmetric key via their communication interfaces. This key exchange may comprise, for example, a Diffie-Hellman key exchange. After exchanging cryptographic keys, user device 400 and the identity service provider computer may communicate over a public channel (such as an unsecured network) using a standard authenticated encryption scheme. Messages between user device 400 and the identity service provider computer can be encrypted with the symmetric cryptographic key. Additional authentication methods, such as digital signatures, can also be used.

Biometric interface 406 may comprise any suitable interface for capturing biometrics. In some embodiments, biometric interface 406 may comprise an integrated camera, such as a front facing or rear facing camera on a smartphone. Other examples of biometric interfaces include microphones (used to capture biometric voice recordings), touchscreens (used to capture fingerprints) or the like. In some embodiments, biometric interface 406 is used to capture an image of the user's face (a "selfie"), which can be used by an identity service provider computer to verify the identity of the user.

Computer readable medium 408 may comprise hardware that may possess or store code, data, or instructions that can be interpreted by processor 402. Computer readable medium 408 may store data and a number of software modules, including a communication module 410, a biometric module 412, an identity token module 414, a policy token module 416, a proof generation module 418, a cryptography module 420, a delegation module 422, cryptographic materials 424, and identity token 426.

Communication module 410 may comprise code, software, or instructions the may be interpreted and executed by processor 402. This software may be used by user device 400 in order to communicate with other computers, devices, and entities in the identity service system, such as the computers, devices, and entities displayed in FIG. 3. This may include code or instructions for: requesting an identity token from a token server computer; receiving and interpreting identity tokens from a token server computer; receiving cryptographic nonsense or other cryptographic materials (e.g., public cryptographic keys) from a relying entity computer, token server computer, or an identity service provider computer; transmitting information used to generate identity tokens, such as commitments, digital representations of identity documents, self-certified identity attributes, etc. Additionally, communication module 410 may comprise code or instructions, executable by processor 424 for receiving policy tokens from relying entity computers, transmitting zero-knowledge proofs, generating and formatting messages, and requesting delegated identity tokens, receiving delegated identity tokens, and transmitting delegated identity tokens. Communication module 410 may enable user device 400 to communicate with other computers and devices according to any appropriate communication protocol, such as the user datagram protocol (UDP), the transmission control protocol (TCP), ISO 8583, etc.

Biometric module 412 may comprise code or instructions, executable by processor 402 for collecting biometrics using biometric interface 406. Additionally, biometric module 412 may comprise code or instructions, executable by processor 402 for comparing captured biometric instances with biometric templates stored in computer readable medium 408. For example, prior to an interaction with a relying entity (such as a transaction between a merchant relying entity and a user), biometric module 412 may be used to verify that the user is in possession of the user device 400. The user may use user device 400 to capture an image of their iris using an integrated camera (biometric interface 406). This image may be converted into a biometric template (e.g., an iris code) and compared against a biometric template stored on computer readable medium 408. If the templates match, the user is likely in possession of user device 400. Once this has been verified, user device 400 can participate in an identity attribute verification process (e.g., receiving a policy token from the relying entity computer, generating a zero-knowledge proof, transmitting the zero-knowledge proof to an identity service provider computer, etc.).

Identity token module 414 can comprise code or instructions, executable by the processor 402, for requesting, managing, and storing identity tokens. User device 400 may use identity token module 414 to request an identity token (i.e., identity token 426) from a token server computer. User device 400 may also use identity token module 414 to read, parse, or interpret identity token 426. In some embodiments, identity token 426 is encrypted and user device 400 may use identity token module 414 to decrypt identity token 426. User device 400 can also use identity token module 414 in order to determine a set of identity attributes that correspond to a policy token received from a relying entity computer. This set of identity attributes may comprise the identity attributes that the user device 400 can use to generate a zero-knowledge proof and/or the comprising sub-proofs.

Additionally, identity token module 414 may be used by user device 400 to compile and prepare any information used to request an identity token. This information can include a user device identifier, a list of identity providers or identity provider computers, identifiers or digital addresses of the identity provider computers, requested identity attributes (e.g., name, age, account number, etc.), digital representations (such as digital scans) of identity documents (such as a driver's license), biometrics or biometric templates, and any self-certified attributes (e.g., an email address, social media account, etc., associated with the user of user device 400).

Policy token module 416 may comprise code or instructions, executable by processor 402, for receiving and interpreting policy tokens, including policy tokens received from a relying entity computer during an interaction (e.g., a transaction) between user device 400 and the relying entity computer. Interpreting policy tokens may include interpreting the predicates in a policy token, as well as interpreting target identity attributes, comparison values, and comparison functions from their corresponding predicates. In addition, user device 400 may use policy token module 416 to verify policy tokens using a public key corresponding to a token server computer. User device 400 may use policy token module 416 in conjunction with cryptography module 420 and cryptographic materials 424 for this purpose. For example, policy token module 416 may comprise code instructing the processor 402 to retrieve a public cryptographic key corresponding to a token server computer from among the cryptographic materials 424, then decrypt the cryptographic signature using a decryption function from cryptography module 420.

Proof generation module 418 may comprise code or instructions, executable by processor 402, for generating zero-knowledge proofs. This may include generating zero-knowledge proofs during an identity token provisioning phase (described below with reference to FIG. 6), as well as during an interaction with a relying entity computer (described below with reference to FIG. 7). Additionally, user device 400 may use proof generation module 418 to verify proofs of cryptographic signatures (e.g., CL signatures) associated with identity attributes received from a token server computer or identity provider computers during an identity token provisioning phase.

Cryptography module 420 may comprise code or instructions, executable by processor 402, for performing cryptographic operations according to some embodiments. These may include, for example, using public cryptographic keys to verify policy tokens received from relying entity computers, along with identity tokens received from token server computers. Cryptography module 420 may also be used to encrypt messages that the user device 400 transmits to other computers, as well as decrypt messages received from other computers or devices. Further, user device 400 may use cryptography module 420 to decrypt one or more identity attributes, a cryptographic signature, and a proof of the cryptographic signature using a user device private key during an identity token provisioning process (see FIG. 6 below). User device 400 may additionally use cryptography module 420 generate cryptographically secure random numbers or nonces. These random nonces may be used during an identity token provisioning phase as described below with reference to FIG. 6. Additionally, user device 400 may use cryptography module 420 to generate commitments of a master secret and pseudonyms based on the master secret. These commitments and pseudonyms may be used during an identity token provisioning process, particularly in embodiments based on the Idemix (or "Identity Mixer") library (see [4] above).

Delegation module 422 may comprise code or instructions, executable by processor 402, for requesting, managing, transmitting, receiving, and registering delegated identity tokens. Delegated identity tokens may comprise identity tokens delegated by one user device to another. These delegated identity tokens may be derived or based, wholly or partially, on other identity tokens. As an example, a user may possess an identity token corresponding to their medical insurance provider. The user may use this identity token in order to prove their identity when receiving medical services. The user's spouse or child may be covered under the user's medical insurance policy, and may be entitled to the same medical benefits as the user. As such, the user may wish to issue a delegated identity token to user devices corresponding to the user's spouse and user's child. Delegation module 422 may be used by user device 400 for this purpose and similar purposes (e.g., granting access to an Internet subscription-based streaming service, granting access to a videogame console, and/or the like). Delegation of identity tokens is described in more detail below with reference to FIG. 7.

Cryptographic materials 424 may comprise any cryptographic materials used by user device 400 to perform cryptographic functions. Cryptographic materials 424 may include a master secret as well as any number of pseudonyms derived from the master secret. These cryptographic materials may also include a user device public and user device private key, as well as any cryptographic keys received from other computers or devices, such as identity provider public keys, token server computer public keys, and the like.

Identity token 426 may comprise one or more identity tokens associated with the user of user device 400. User device 400 may have received these identity tokens from one or more token server computers during one or more identity token provisioning processes. As described above with reference to FIG. 1, these identity tokens may comprise sets of identity attributes corresponding to one or more identity provider computers or issuer computers. The identity attributes in the sets of identity attributes may be signed according to a signature scheme that enables the generation of zero-knowledge proofs that proof the veracity of the identity attributes (for example, Camenisch-Lysyanskaya signatures). Identity token 426 may be used to generate zero-knowledge proofs in conjunction with proof generation module 418, along with any other relevant software modules (e.g., cryptography module 420).

Figure 5:
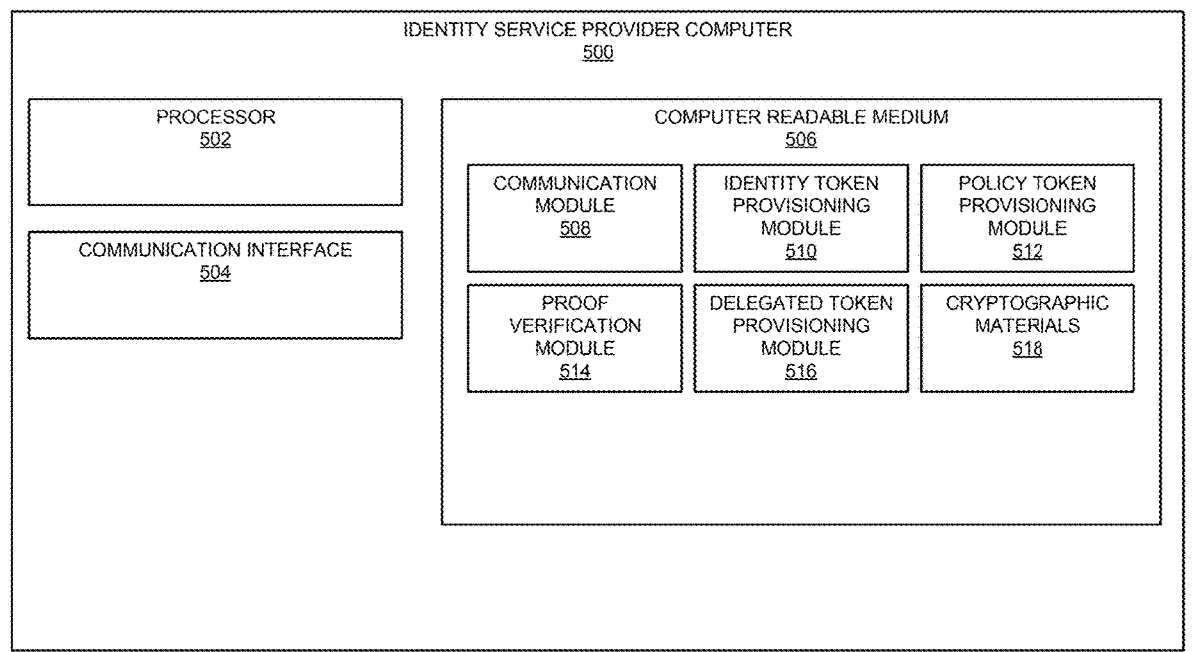
FIG. 5 shows a block diagram of an exemplary identity service provider computer according to some embodiments.

An exemplary identity service provider computer 500 will now be described in more detail with reference to FIG. 5. Identity service provider computer 500 may comprise a processor 502, a communication interface 504, and a computer readable medium 506. Identity Service provider computer 500 may correspond to embodiments where the Identity service provider computer and the token server computer comprise a single computer system (i.e., an identity service system). As such, it should be understood that the identity service provider computer 500 may perform functions that are typically associated with a token server computer.

Processor 502 may comprise any suitable data computation device or devices. Processor 502 may be able to interpret code and carry out instructions stored on computer readable medium 506. Processor 502 may comprise a central processing unit (CPU) operating on a reduced instructional set, and may comprise a single or multicore processor. Processor 502 may also include arithmetic logic unit (ALU) and a cache memory.

Communication interface 504 may comprise any interface by which the identity service provider computer 500 may communicate with other computers or devices. Examples of communication interfaces include wired interfaces, such as USB, Ethernet, or FireWire, as well as wireless interfaces, such as Bluetooth or Wi-Fi receivers. Identity service provider computer 500 may possess multiple communication interfaces 504. As an example, an identity service provider computer 500 comprising a server computer may communicate through Ethernet, USB, and a 3.5 mm jack.

Identity service provider computer 500 may communicate with other devices or computers, using communication interface 504, via one or more secure and authenticated point-to-point channels. These channels may use a standard public-key infrastructure. For example, identity service provider computer 500 and a user device can exchange a symmetric key via their communication interfaces. This key exchange may comprise, for example, a Diffie-Hellman key exchange. After exchanging cryptographic keys, identity service provider computer 500 and the user device may communicate over a public channel (such as an unsecured network) using a standard authenticated encryption scheme, and may encrypt and decrypt any messages sent between them with the symmetric key. The identity service provider computer and the user device can employ additional authentication methods, such as digital signatures.

Computer readable medium 506 may comprise hardware that may possess or store code, data, or instructions that can be interpreted by processor 502. Computer readable medium 506 may comprise data and a number of software modules, including a communication module 508, identity token provisioning module 510, a policy token provisioning module 512, a proof verification module 514, a delegated token provisioning module 516, and cryptographic materials 518.

Communication module 508 may comprise code, software, or instructions the may be interpreted and executed by processor 502. This software module can be used by identity service provider computer 500 in order to communicate with other computers, devices, and entities in an identity service system, such as the identity service system of FIG. 3. This may include code or instructions that enable identity service provider computer 500 to act as an intermediary for communications between user devices and identity provider computers (including issuer computers). Additionally, identity service provider computer 500 may user communication module 508 to transmit requests for identity attributes to identity provider computers, transmit identity tokens to user devices, transmit delegated identity tokens to user devices, receive zero-knowledge proofs from user devices, receive cryptographic nonces from user devices, and transmit verification messages to relying entity computers. Communication module 508 may enable identity service provider computer 500 to communicate with other computers according to any appropriate communication protocol such as the user datagram protocol (UDP), the transmission control protocol (TCP), ISO 8583, etc.

Identity token provisioning module 510 may comprise code or software, executable by processor 502, for generating and provisioning identity tokens to user devices. This may include code for generating an empty identity token and populating the empty identity token with identity attributes (encrypted or otherwise) received from identity providers. Additionally, identity service provider computer 500 may use identity token provisioning module 510 to evaluate or verify identity attributes extracted from identity documents, as well as self-certified attributes provided by a user and/or user device.

Policy token provisioning module 512 may comprise instructions, code, or software, executable by processor 502, for generating policy tokens and distributing those policy tokens to relying entities. Further, identity service provider computer 500 may use policy token provisioning module 512 to evaluate and process request for policy tokens. This may include evaluating requested predicates (i.e., predicates desired and specifically requested by relying entities), and evaluating other information included in request for policy tokens, such as merchant category codes. Further, identity service provider computer 500 may use policy token provisioning module 512 to approve or deny request for policy tokens.

As an illustrative example, a relying entity may comprise a private school that is legally required to screen potential employees (users) during the hiring process. Typically, the sort of screening is accomplished with a background check, a lengthy document the details the user's recent history, particularly the user's recent employment, residency and criminal background. However, instead, the screening process can be accomplished using identity tokens corresponding to the potential employees.

The private school may be primarily concerned with the user's criminal background, particularly drug-related offenses, violent offenses, and crimes against minors. The private school may be less concerned with petty crimes such as shoplifting. Further, the private school may have no legal requirement to verify the perspective employee's residence history. The prospective employee may be embarrassed by their residence history may be or may be concerned that their residence history will expose the prospective employee to bias or discrimination (e.g., the perspective employee may have spent some time in a homeless shelter).

Prior to employee screening, the private school may request a policy token from identity service provider computer 500. The private school may include some desired predicates in their request, including predicates corresponding to the employee's residency history and criminal background. The request may also include a merchant category code corresponding to the private school. This merchant category code may indicate to identity service provider computer 500 that the relying entity is a private school.

The identity service provider computer 500 may use identity token provisioning module 510 to analyze this request. Using the merchant category code or any other information provided by the private school, identity service provider computer 500 can determine any applicable legal identity verification requirements. For example, the private school may be required to verify that perspective employees have not been convicted of crimes corresponding to drug offenses, violent offenses, or crimes against minors. The school may not have a legal requirement to verify whether prospective employees have been convicted of minor crimes such as shoplifting. Identity service provider computer 500 may compare the determined legal verification requirements against the requested predicates. As such, Identity service provider computer 500 may determine that the private school does not need to verify the perspective employee's residence history, and may not generate a predicate corresponding to residence history. As such, identity service provider computer 500 may generate a policy token comprising predicates corresponding to the user's relevant criminal history, and not comprising predicates corresponding to the user's irrelevant criminal history or the user's residency. The identity service provider computer 500 may issue this policy token to a relying entity computer associated with the private school. During a perspective employee verification interaction, a relying entity computer associated with the private school can transmit a policy token to the user device associated with a perspective employee. The user device can subsequently generate zero-knowledge proofs corresponding to the predicates in the policy token. The limited set of predicates contained in the private school's policy token guarantee that the private school can meet their legal requirement to screen prospective employees, while protecting the prospective employee from being forced to disclose potentially embarrassing personal information.

Proof verification module 514 may comprise code or instructions, executable by processor 502, for verifying zero-knowledge proofs and sub-proofs in order to verify identity attributes corresponding to a user. Proof verification module 514 may comprise a number of sub-verifiers, each corresponding to a sub-proof. Each sub-verifier may be used by identity service provider computer 500 to verify a corresponding sub-proof. For example, a particular sub-proof may prove that the user is over a particular age (e.g., 21 or 55), and the proof verification module 514 may comprise a sub-verifier corresponding to age verification, which the identity service provider computer 500 can use to verify the sub-proof corresponding to user's age. After verifying each individual sub-proof, the identity service provider computer 500 may use proof verification module 514 to generate a verification message. The verification message may be sent to a relying entity in order to communicate to the relying entity whether the zero-knowledge proof (and the sub-proofs that comprise it) were verified successfully.

To continue the private school example, one sub-proof may correspond to a prospective employee's drug offenses, while a second sub-proof may correspond to the perspective employee's violent offenses, and a third sub-proof may correspond to the prospective employee's offenses against minors (or conversely, their lack thereof). After using each of the corresponding sub-verifiers to verify these three sub-proofs (in doing so, verifying that the prospective employee has no drug offenses, no violent offenses, and no offenses against minors), the identity service provider computer 500 may generate a verification message to this effect, i.e., indicating that the prospective employee has no drug offenses, no violent offenses, and no offenses against minors. Identity service provider computer 500 may use communication module 508 to transmit the verification message to the relying entity computer associated with the private school.

Delegated token provisioning module 516 may comprise code or instructions, executable by processor 502, for processing requests for delegated identity tokens, generating delegated identity tokens, transmitting delegated identity tokens to user devices, and registering delegated identity tokens in a database in association with a corresponding user device. As described above, delegated identity token may be delegated by one user device to another. Delegated identity tokens may be useful when one user is entitled to the benefits associated with the identity token of another user. For example, a user may have an identity token that the user uses to verify identity attributes corresponding to their medical insurance. The user's child (a second user) may be covered by the same medical insurance policy. As such, the user may wish to produce a delegated identity token and give it to the second user so that the second user can receive medical attention. Identity service provider computer 500 may use delegated token provisioning module 516 for this purpose.

Cryptographic materials 518 may comprise any cryptographic materials that the identity service provider computer 500 can use to accomplish its designated functions. These cryptographic materials may include a public-private key pair corresponding to identity service provider computer 500, as well as public keys corresponding to other computers in an identity service system (such as the system of FIG. 3), including user device public keys, issuer computer public keys, identity provider public keys, cryptographic nonces, commitments, and the like.

Figure 6:
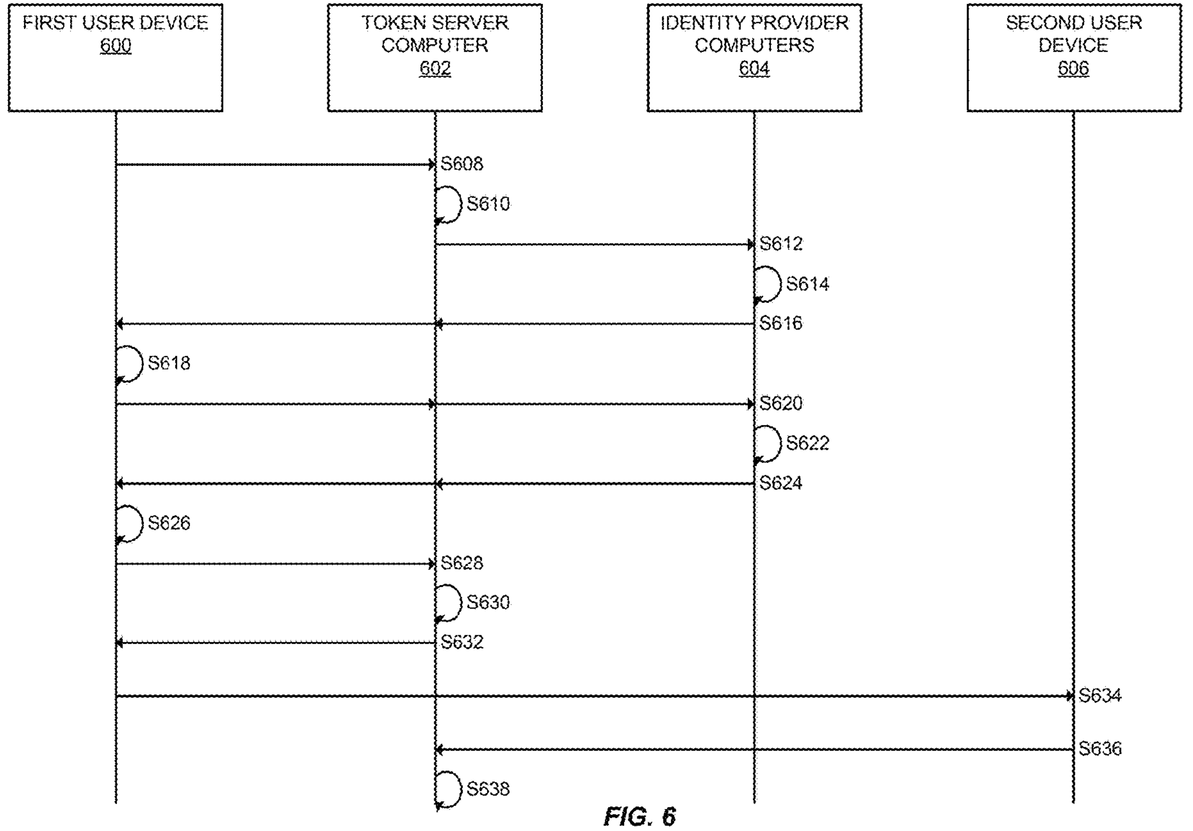
FIG. 6 shows a sequence diagram of an exemplary identity token provisioning process according to some embodiments.

Before using policy tokens and identity tokens to verify a user of a user device, an identity token first needs to be provisioned to a user device. FIG. 6 shows a flowchart of an exemplary identity token provisioning process according to some embodiments. In FIG. 6, a first user device 600 is provisioned an identity token (steps S608-S626). Optionally and subsequently, the first user device 600 can requests a delegated identity token that is generated and provisioned to a second user device 606 (steps S628-S634). Alternatively, the first user device 600 can generate the delegated identity token itself and provision it to the second user device 606, or the first user device 600 can communicate with the identity provider computers 604 (either directly, or via the token server computer 602 as an intermediary) in order to generate the delegated identity token. The second user device 606 can subsequently register the delegated identity token with token server computer 602 (steps S636 and S638).

At step S608, the user device 600 can request an identity token from token server computer 602. The user device 600 may include any information that pertains to the request for an identity token. This may include a device identifier or device address, which can be used by the token server computer 602 to transmit the identity token to the user device 600. This information may also include a list of identity provider computers 604, which the token server computer 602 can communicate with in order to acquire identity attributes for the identity token. The information may also include identifiers or digital addresses corresponding to identity provider computers 604. Additionally, the user device 600 may specify the desired identity attributes, such as an identity attribute corresponding to the user's name, an identity attribute corresponding to the user's physical location, etc. The user device 600 may also provide digital representations of identity documents, or identity attributes extracted from identity documents, as well as self-certified identity attributes provided by the user. The token server computer 602 may use an identity document validation service and/or a user data validation service to verify these identity attributes. These validation services may comprise one or more identity provider computers. Further, in some embodiments, the first user device 600 may provide a biometric (such as an image of the user's face) in order to verify that the legitimate owner of the first user device 600 is participating in the enrollment process.

At step S610, token server computer 602 can perform setup operation associated with preparing the identity token. These setup operations may include generating an empty identity token containing fields for identity attributes corresponding to the requested identity attributes and the identity provider computers. Additionally, token server computer 602 may identify and initiate communication with identity provider computer 604.

At step S612, the token server computer 602 can transmit a request for identity attributes to the identity provider computer 604. This request may include a request to verify the identity attributes extracted from the identity documents as well as the self-certified attributes provided by the user. These identity attributes may have been received in encrypted form from the first user device 600, and likewise, the token server computer 602 may transmit these identity attributes or other information in encrypted form to the identity provider computer 604 (e.g., without ever decrypting these identity attributes). Additionally, the request may indicate the desired identity attributes by including labels corresponding to those identity attributes. As an example, the request may include a labels such as "AGE" and "ZIP CODE" to indicate the user desires identity attributes corresponding to the user's age and zip code. The request may also include any of the information provided by the first user device 600 to the token server computer 602, such as digital representations of identity documents, biometrics (such as a picture of the user's face), etc. The identity provider computers 604 can use this information to validate the enrollment, as described below in step S614. The token server computer 602 may have received this information from the first user device 600 in encrypted form, and may likewise transmit this information in encrypted form to the identity provider computers 604.

At step S614, the identity provider computers 604 can evaluate the request. From the request, the identity provider computers can identify the user or a user account corresponding to the first user device 600. Additionally, the identity provider computers 604 can use any data or information provided by the first user device 600 to validate the enrollment. For example, the identity provider computers 604 can compare a biometric (such as a picture of a user's face) against a biometric on file, or a biometric extracted from an identity document (e.g., a picture of the user's face on a driver's license). This validation process may allow the identity provider computers 604 to confirm that the user (and not a fraudster) is enrolling in the identity service system. Further, the identity provider computer 604 can each generate any data or information used to generate the identity attributes or generate zero-knowledge proofs corresponding to the identity attributes (e.g., a zero-knowledge proof proving that an identity attribute was generated or provided by a particular identity provider computer 604. In one exemplary embodiment, the identity provider computers 604 can each generate a first cryptographic nonce, which may be used to generate the Camenisch-Lysyanskaya (CL) signatures associated with each identity attribute.

Subsequently, at steps S616-S626, the first user device 600 and the identity provider computers 604 can work together to generate the identity token. The token server computer 602 may act as a router or intermediary at this time, enabling the first user device 600 to communicate with identity provider computers 604 and vis versa. However, communications between first user device 600 and identity provider computers 604 may be encrypted in order to prevent token server computer 602 from eavesdropping, and likewise preserves the user's privacy by keeping the identity attributes in encrypted form.

At step S616, the first user device 600 may receive, from each of the identity provider computers 604, via token server computer 602, a first cryptographic nonce and a public identity provider key. The first user device 600 can use the public identity provider keys to encrypt communications sent by the first user device 600 to the identity provider computers 604, in order to prevent the token server computer 602 from interpreting these communications.

At step S618, the first user device 600 may perform a series of intermediate operations used to generate the identity attributes and generate any additional information that may be used to verify the identity attributes using a zero-knowledge proof system. In one exemplary embodiment, described below, the first user device 600 may perform these intermediate operations in order to generate CL signatures corresponding to the identity attributes. However, it should be understood that other non-CL signature based methods may be employed. These intermediate operations may include validating the identity provider public keys in order to determine that they correspond to legitimate identity provider computers 604. Additionally, the first user device 600 can generate a second random nonce using any appropriate random or pseudorandom number generator. Further, the first user device 600 can generate a commitment of a master secret, as well as a proof of the commitment. The identity provider computers 604 can use the commitment of the master secret and the second random nonce to generate CL signatures corresponding to the identity attributes (for more detail, see [4]). The first user device 600 can subsequently generate a message comprising the commitment, the proof of the commitment, the second random nonce and a user device public key. The user device public key can enable the identity provider computers 604 to encrypt messages sent to the first user device 600, in order to prevent the token server computer 602 from eavesdropping on communications between the first user device 600 and the identity provider computers 604. The first user device can then encrypt the message using the identity provider public key, thereby generating an encrypted message.

At step S620, the first user device 600 can transmit the encrypted message to the identity provider computers 604 via the token server computer 602.

At step S622, each identity provider computer of identity provider computers 604 can decrypt the encrypted message using a corresponding identity provider private key and generate a cryptographic signature (i.e., a CL signature), a proof of the cryptographic signature, and one or more identity attributes. The identity provider computers 604 can use the commitment and the second random nonce to generate the CL signature, using a software package such as Idemix ([4]), or another other appropriate method.

At step S624, the user device 600 can receive the identity token from the token server computer 602, or from the identity provider computers 604 via token server computer 602. The identity token can comprise one or more identity attributes and one or more identity signatures (corresponding to one or more identity providers of identity provider computers 604). Additionally, the identity token may comprise the cryptographic signature(s) and the proof(s) of the cryptographic signatures. The identity attributes, cryptographic signature(s) and proof the cryptographic signatures may be encrypted using the user device public key.

At step S626, the first user device 600 can decrypt the one or more identity attributes, the cryptographic signature, and a proof of the cryptographic signature received from identity provider computers 604 using a user device private key. Subsequently, the first user device 600 can perform a cryptographic proof verification process to verify the proof of the cryptographic signature. This verification process may be based off verifiable computation, and may allow the first user device 600 to determine if the cryptographic signature was generated correctly. If the cryptographic signature was generated correctly, the first user device 600 may store the identity token on a memory element. At a later time, the first user device 600 can use the stored identity token during an identity attribute verification process (e.g., as described below with reference to FIG. 7).

At this point, the first user device 600 is now able to perform identity attribute verification. A user of the first user device 600 may additionally wish to provision a delegated identity token to a second user device 604 (e.g., a user device owned by the spouse or a child of the first user. To this end, at step S628, the first user device 600 may transmit a request for a delegated identity token to the token server computer 602. The request may include an identifier associated with the delegated user (e.g., "Jane Doe, John Doe's wife"). Additionally, the request may include the identity token or one or more encrypted identity attributes from the identity token. In some alternative embodiments, the first user device 600 may generate the delegated identity token itself, or in conjunction with the identity provider computers 604, without the assistance of the token server computer 602.

At step S630, the token server computer 602 can participate in generating the delegated identity token using the information provider by the first user device 600. For example, this can be accomplished in generally the same way as described above with reference to steps S608-S624, with the token server computer 602 acting as an intermediary for communications between the first user device 600 and the identity provider computers 604.

At step S632, the token server computer 602 can transmit the delegated identity token to the first user device 600 (e.g., by routing encrypted identity attribute information from the identity provider computers 604 to the first user device 600, as described above). Optionally, the first user device 600 can verify the delegated identity token by comparing the identity attributes stored in the delegated identity token against identity attributes stored in the identity token corresponding to the first user device 600.

At step S634, the first user device 600 can transmit the delegated identity token to the second user device 606. The second user device 606 can store the delegated identity token on a memory element (or other data storage device), and use the delegated identity token in an identity attribute verification process.

Optionally, the second user device 606 can register their ownership of the delegated identity token with token server computer 602. To this end, at step S636, the second user device 606 can transmit the delegated identity token to token server computer 602, along with a delegated identity token registration message. This message may include a device identifier corresponding to the second user device 606.

At step S638, the token server computer 602 can register the delegated identity token (for example in a database) in association with the identifier corresponding to the second user device.

Figure 7:
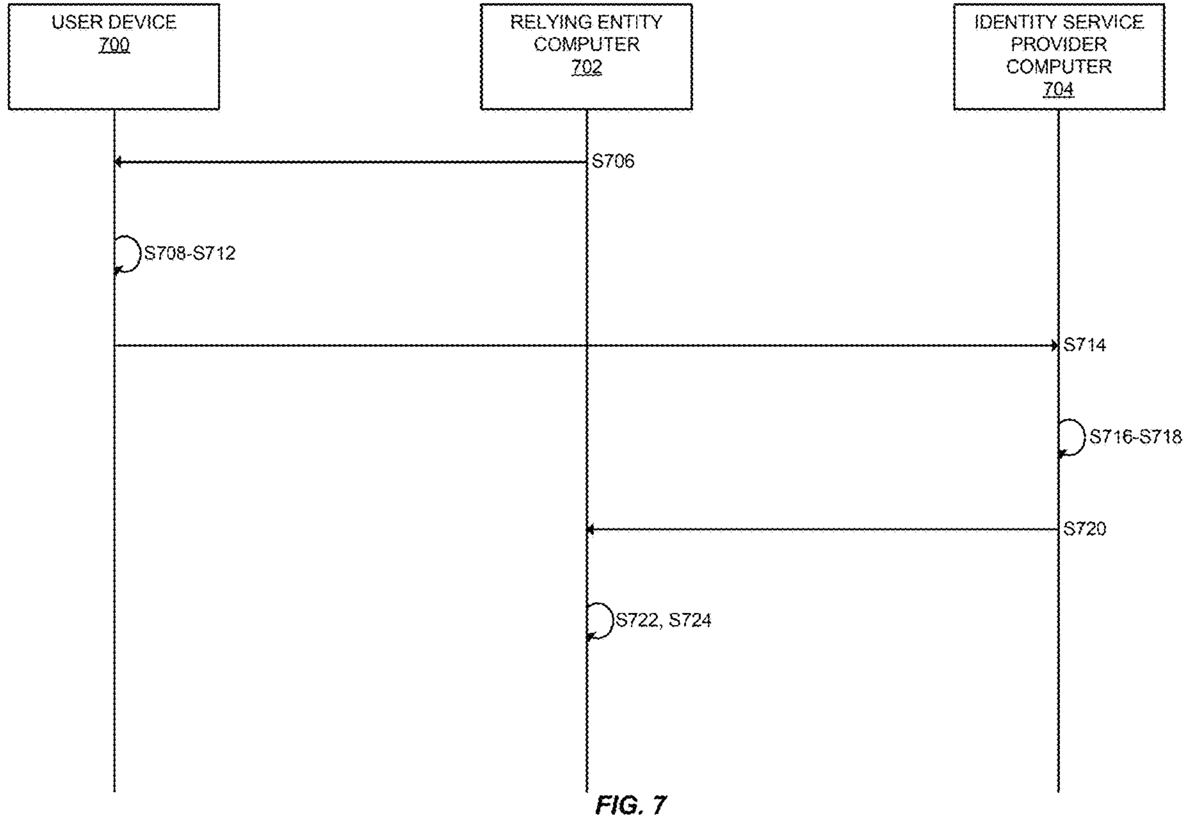
FIG. 7 shows a sequence diagram of an exemplary user verification process according to some embodiments.

Once a user device and relying entity computer have received and stored their identity token and policy token respectively, the user device and relying entity computer can use their respective tokens during user verification prior to an interaction. The interaction can comprise, for example, a transaction between a relying entity and a user, such as the sale of alcohol. During this interaction, the user device can generate a zero-knowledge proof that can be verified by an identity service provider computer in order to verify the user's identity attributes. For example, the identity service provider computer may verify the zero-knowledge proof in order to verify that the user is old enough to legally purchase alcohol. FIG. 7 shows a flowchart of an exemplary method of identity attribute verification according to some embodiments.

At step S706, a user device 700 can receive a policy token from a relying entity computer 702. This policy token may have been issued to the relying entity computer 702 by a token server computer. Relying entity computer 702 may have requested a policy token prior to step S706, e.g., during a policy token provisioning process. Relying entity computer 702 may have transmitted a list of requested predicates, verification requirements, and/or a merchant category code to the token server computer. The token server computer may have analyzed this information, generated an appropriate policy token, and transmitted the policy token to relying entity computer 702. Further, the policy token may be cryptographically signed using a private key corresponding to the token server computer. In addition to the policy token, at step S706, user device 700 may receive a cryptographic nonce from the relying entity computer 702. This cryptographic nonce may be used by user device 700 to generate a zero-knowledge proof. The cryptographic nonce may also be included in a verification message sent by identity service provider computer 704 to relying entity computer 702 (i.e., at step S720) that enables relying entity computer 702 to verify the verification message.

As described above with reference to FIG. 2, the policy token may comprise one or more predicates, and each predicate may comprise one or more target identity attributes (e.g., user age, user zip code, etc.), one or more comparison values (e.g., a minimum age required to purchase alcohol, a list of approved zip codes, etc.) and a comparison function. The comparison function can comprise an inequality function or a set-membership function, among others. Each predicate can correspond to one or more identity attributes from a set of identity attributes from an identity token stored by user device 700. For example, a predicate could comprise a target identity attribute corresponding to the user's age, and thus the predicate corresponds to the user's age identity attribute.

At step S708, the user device 700 can verify the policy token using a public key corresponding to the token server computer. The user device 700 can verify the policy token using a cryptographic signature included in the policy token (e.g., cryptographic signature 218 from FIG. 2). By verifying the policy token, the user device 700 can determine whether the policy token is a legitimate policy token produced by a token server computer. If the policy token is verified successfully, user device 700 can proceed to generate the zero-knowledge proof.

At step S710, the user device 700 can determine, based on the policy token and an identity token corresponding to a user of the user device, a set of identity attributes from the identity token corresponding to the user. The identity token may have previously been issued to user device 700 by a token server computer, e.g., as described in FIG. 6. The set of identity attributes may correspond to the target identity attributes defined by the predicates in the policy token received in step S706. For example, if the predicates correspond to determining if the user is older than a particular age (e.g., 55), and determining if the user lives within a particular set of zip codes (e.g., {94610, 94611, and 94612}), then the set of identity attributes may comprise the user's age identity attribute and the user's zip code identity attribute. The user device 700 may use the set of identity attributes to generate the sub-proofs used to verify the user. By determining the set of identity attributes prior to generating the sub-proof, the user device 700 avoids including unneeded information in the sub-proofs.

At step S712, the user device 700 initiates verification of the user using the policy token and the set of identity attributes from the identity token. In some embodiments, initiating verification of the user comprises the user device 700 generating a zero-knowledge proof. As stated above, an identity service provider computer can verify the zero-knowledge proof by verifying one or more sub-proofs that comprise it, in order to verify the user. The user device 700 can generate the zero-knowledge proof using one or more sub-provers to generate one or more sub-proofs that comprise the zero-knowledge proof. The zero-knowledge proof can be based on a cryptographic nonce received by the user device 700 at step S706, as well as a master secret stored on the user device 700, and a pseudonym. Additionally, the zero-knowledge proof can correspond to the one or more predicates and the set of identity attributes. The user device 700 can generate the zero-knowledge proof using an anonymous credential library (such as [4]: Idemix), or another appropriate software package.

Generating the zero-knowledge proof may comprise generating one or more sub-proofs corresponding to the one or more predicates (e.g., a sub-proof proving that the user is older than a certain age and a sub-proof proving that the user lives within a specific geographic region). Additionally, generating the zero-knowledge proof may comprise generating one or more sub-proofs corresponding to one or more identity attribute signatures. These identity attribute signatures may be CL signatures produced by an identity provider (or identity providers) that provided the identity attributes used in the identity token. The sub-proofs corresponding to the one or more identity attribute signatures may prove that the identity attributes used to generate the sub-proofs have been signed by legitimate identity providers, as opposed to being "made-up" or arbitrarily generated by a malicious user device. Thus, the one or more sub-proofs corresponding to the set of identity attribute signatures verify that each identity attribute of the set of identity attributes corresponds to one or more identity providers.

At step S714, user device 700 transmits the zero-knowledge proof comprising the one or more sub-proofs to the identity service provider computer 704. Additionally, user device 700 can transmit the cryptographic nonce (received from the relying entity computer 702 at step S706 and used to generate the zero-knowledge proof) to the identity service provider computer 704. The user may transmit the zero-knowledge proof in encrypted or unencrypted form over a network such as the Internet.

At step S716, the identity service provider computer 704 verifies the zero-knowledge proof to verify the user. The identity service provider computer 704 may verify the zero-knowledge proof by verifying the plurality of sub-proofs corresponding to (i.e., comprising) the zero-knowledge proof using a plurality of sub-verifiers, the plurality of sub-verifiers each corresponding to a sub-proof of the plurality of sub-proofs. The plurality of sub-proofs may comprise one or more sub-proofs corresponding to one or more predicates from a policy token (i.e., the policy token transmitted by the relying entity computer 702 at step S706). Additionally, the plurality of sub-proofs may comprise one or more sub-proofs corresponding to one or more identity attribute signatures corresponding to one or more identity attributes.

As an example, a zero-knowledge proof may comprise two sub-proofs, one that proves that the user is older than a certain age, and the other proving that the user's age identity attribute is signed using a legitimate identity provider signature. The identity service provider computer 704 can use a sub-verifier corresponding to an inequality function to verify the first sub-proof, and a sub-verifier corresponding to a CL signature verification function to verify the second sub-proof.

At step S718, the identity service provider computer 704 can generate a verification message based on the verification of the zero-knowledge proof. The verification message can indicate whether the zero-knowledge proof verified successfully or unsuccessfully. The verification message can include a Boolean value, such as "TRUE" or "FALSE" to indicate whether the zero-knowledge proof was verified successfully, Additionally, the verification message can include the cryptographic nonce, as well as any other pertinent information (e.g., a timestamp, a device identifier, etc.). The identity service provider computer 704 can cryptographically sign the verification message using a private key in order to demonstrate that the verification message was generated by the identity service provider computer 704.

At step S720, the identity service provider computer 704 can transmit the verification message to the relying entity computer 702 via, for example, a communication network such as the Internet.

At step S722, the relying entity computer 702 can verify the verification message using a public key corresponding to the identity service provider computer 704. Using the public key, the relying entity computer 702 can confirm that the verification message was cryptographically signed using the identity service provider computer's 704 private key, thereby confirming that the verification message was generated and transmitted by the identity service provider computer 704. Additionally, the relying entity computer 702 can verify the cryptographic nonce received from the identity service provider computer 704. The relying entity computer 702 can verify the cryptographic nonce by comparing it to the cryptographic nonce that it sent to user device 700 at step S706, in order to determine if they match.

After verifying the verification message, at step S724, the relying entity computer can evaluate or otherwise parse the verification message to determine if the zero-knowledge proof was successfully verified by the identity service provider computer 704. This evaluation may involve identifying and interpreting a Boolean value in the verification message. If the Boolean value is "TRUE," the zero-knowledge proof was verified successfully, if the Boolean value is "FALSE," the zero-knowledge proof was not verified successfully. If the zero-knowledge proof was verified successfully, the relying computer 702 can perform an interaction with the user device 700. As an example, the interaction could comprise a transaction, such as an e-commerce transaction between a consumer (user) and an e-commerce alcohol delivery business (relying entity computer).

The description above, particularly with reference to FIG. 7, generally relates to "dynamic proofs" (also referred to as "dynamic queries"). These proofs are "dynamic" because they are generated during a user verification process (i.e., dynamically) in response to receiving a policy token from a relying entity computer. However, some embodiments use "static proofs" or "static queries." These static proofs are generated at one time and do not change. Further, static proofs can be stored on a user device. Static proofs may be useful when there are verification requirements that are common or unchanging. For example, liquor stores in the United States are required to verify that a customer is over 21, and are not usually required to verify anything else. These verification requirements are usually independent of the particular state or city where the liquor store is located. As such, a user device can pre-compute or pre-generate a static proof attesting that the user is over 21. During an interaction with a relying entity, the user can provide this static zero-knowledge proof to an identity service provider computer, in order to verify the user and complete the transaction. The use of static proofs may be advantageous because it reduces the number of communications between the user device and the relying entity computer, increasing the speed of the verification process. Additionally, some older relying entity computers may possess the means to communicate with an identity provider computer (e.g., via an Ethernet cable that connects the relying entity computer to the internet), but may not possess the means to communicate directly with a user device, in order to transmit the policy token to the user device (e.g., they may not possess a screen that can display a QR code or may not be capable of cellular or near-field communication). The use of static proofs enables these relying entity computers to participate in the verification process, because they do not need to transmit a policy token to the user device.

Other variations of token provisioning and identity attribute verification include the use of "device specific" and "application specific" identity tokens. A device specific identity token is specific to a particular user device, such as a particular smartphone. An application specific identity token is specific to a particular relying entity, such as a particular ecommerce business that runs an ecommerce application. A user may possess and store a single device specific identity token on each of their user devices (e.g., one identity token for their smartphone, one identity token for their laptop, etc.). In contrast, a user may possess and store multiple application specific identity tokens on a single user device. However, the user may only possess one application specific identity token per application. Device specific identity tokens may be desirable when an identity token is associated with a service that is particular to a given device. For example, a smartphone may store and operate a digital wallet that is not available to the user on other user devices (e.g., a laptop). Application specific tokens may be desirable when relying entities want to retain more control or ownership over the verification process, requiring users to use identity tokens that are specific to their particular application. Pseudonyms (randomized commitments generated from a master secret) may be used to generate application specific identity tokens. As an example, during a token provisioning process, for each application specific identity token, the user device can generate a corresponding pseudonym that can be used as cryptographic material during the token provisioning process (e.g., as a commitment of a master secret used during step S618 from FIG. 6).

Figure 8:
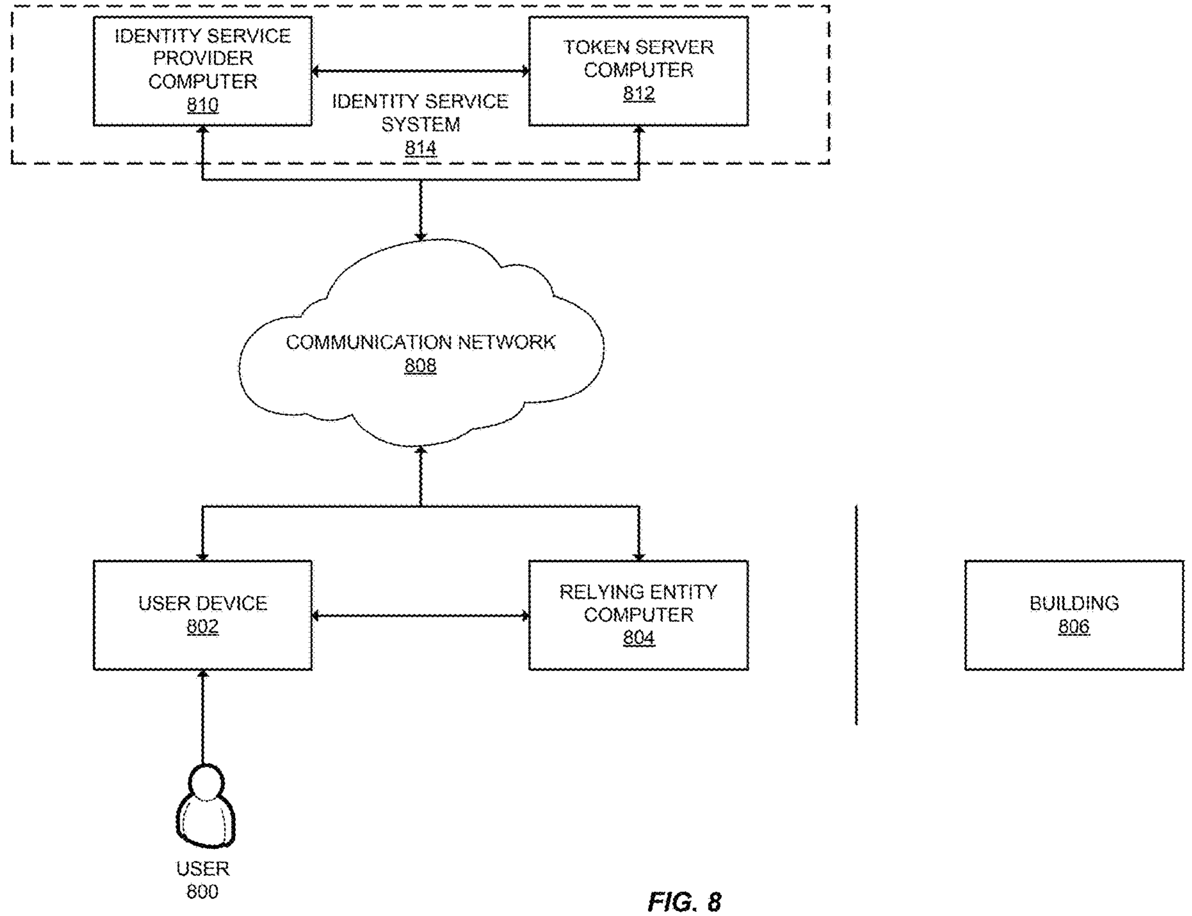
FIG. 8 shows a system block diagram of an exemplary user verification use case according to some embodiments.

Most of the example use cases presented above, correspond to transactional examples, such as the liquor store example. In these examples, the relying entity provided a good (such as alcohol) or service to a user during a business transaction. However, it should be understood that some embodiments may be utilized in non-commercial or non-transactional contexts. FIG. 8 shows an example of such a use case.

FIG. 8 shows a building access system that can be used to control access to building 806 using an identity service system 814. Like identity service system 318 from FIG. 3, identity service system 814 may comprise an identity service provider computer 810 and a token server computer 812. In some embodiments, the identity service provider computer 810 and the token server computer 812 may constitute a single computer entity.

In the example of FIG. 8, the user 800 may wish to access building 806. As an example, building 806 may comprise an apartment complex containing the apartment where user 800 lives. Alternatively, building 806 may comprise a government building (where the user 800 works) that requires some form of clearance to access. A relying entity may use a relying entity computer 804 to control access to building 806. The relying entity may comprise a security division charged with protecting and controlling access to building 806.

User 800 may possess a user device 802, such as a smartphone. The user device 802 can store an identity token containing identity attributes corresponding to user 800. This identity token may have previously been provisioned to user device 802 by identity service system 814 via communication network 808.

Likewise, relying entity computer 804 possesses a policy token comprising one or more predicates. These predicates indicate the identity attributes that the relying entity needs to verify, as well as how those identity attributes should be verified. This policy token may have been issued to relying entity computer 804 by token server computer 812 via communication network 808. The relying entity computer 804 may comprise a kiosk or other computer system in proximity to building 806. As an example, relying entity computer 804 may be integrated into a call box or intercom system near the door to building 806. The door may be locked using a computerized or electronic locking system, which prevents unauthorized access to building 806.

When user 800 wants to gain access to building 806, user 800 may bring user device 802 in close proximity with relying entity computer 804. User device 802 and relying entity computer 804 may begin to communicate via near-field communication, or another appropriate communication method. Using near-field communication, relying entity computer 804 may transmit a policy token to user device 802. Alternatively, the relying entity computer 804 may display a QR code on a display screen. This QR code may encode or otherwise represent the policy token. User device 802 can use an interface such as an integrated camera to scan the QR code, then decode the QR code to produce the policy token.

After receiving the policy token from relying entity computer 804, user device 802 may verify the policy token using a digital signature included in the policy token (i.e., cryptographic signature 218 from FIG. 2). User device 802 may use a public cryptographic key corresponding to token server computer 812 in order to verify the policy token. If the policy token is legitimate, user device 802 can use the policy token and an identity token stored on user device 802 to generate a zero-knowledge proof corresponding to the predicates in the policy token.

As stated above, a zero-knowledge proof may comprise one or more sub-proofs corresponding to one or more predicates in the policy token. In the use case of FIG. 8, the relying entity computer 804 may want to verify that the user 800 is a user that is authorized to access to building 806. As such, the policy token may comprise a predicate with a target identity attribute corresponding to the user's name identity attribute, a set membership comparison function, and one or more comparison values corresponding to a list of approved users. User device 802 may generate a zero-knowledge proof comprising two sub-proofs. The first sub-proof may prove that the user's 800 name identity attribute is included in the list of approved users. The second sub-proof may prove that the user's name identity attribute was issued by a legitimate identity provider (e.g., a government agency such as the DMV). The second sub-proof may be based on a CL signature associated with the user's 800 name identity attribute.

These two sub-proofs may be compiled into a single zero-knowledge proof, which the user device 802 transmits to identity service provider computer 810 via communication network 808. Identity service provider computer 810 may verify the zero-knowledge proof by verifying each sub-proof individually. That is, identity service provider computer 810 may verify the first sub-proof, verifying that the user's 800 name identity attribute is included in the list of approved users. Identity service provider computer 810 may also verify the second sub-proof, verifying that the user's 800 name identity attribute was issued by a legitimate identity provider.

Once the identity service provider computer 810 has verified the zero-knowledge proof, identity service provider computer 810 may generate a verification message. The verification message may indicate that the zero-knowledge proof was verified successfully. The verification message can take any appropriate form. For example, the verification message may comprise a simple Boolean statement such as "TRUE" (indicating that the zero-knowledge proof was verified successfully) or "FALSE" (indicating that the zero-knowledge proof was not verified successfully). Alternatively, the verification message may comprise a more detailed statement or set of information, such as the statement: "the user's identity is legitimate and the user is included in the list of users that have access to the building." The verification message may include any other pertinent information, such as a timestamp, a user identifier, etc. In addition, the verification message may be signed by identity service provider computer 810 using a private cryptographic key corresponding to identity service provider computer 810. The verification message may serve as an assertion, indicating that the identity service provider computer 810 asserts that user 800 should be granted access to building 806. Identity service provider computer 810 may transmit the verification message to relying entity computer 804 via communication network 808.

Upon receiving the verification message, relying entity computer 804 may verify that the verification message was generated by identity service provider computer 810. Relying entity computer 804 may use a cryptographic signature included in the verification message in order to verify that the verification message was generated by identity service provider computer 810. In some embodiments, relying entity computer 804 uses a public cryptographic key corresponding to identity service provider computer 810 to verify the cryptographic signature.

After verifying and interpreting the verification message, relying entity computer 804 may grant user 800 access to building 806. The relying entity computer 804 may accomplish this by transmitting an electronic signal to the electronically locked door of building 806 in order to unlock the door, thus enabling user 800 to enter building 806. In this way, privacy-preserving identity attribute verification is used to control access to building 806. The identity service provider computer 810 can verify that the user 800 has access to building 800, without the identity service provider computer learning the user's 800 name, thus preserving the user's privacy.

Some additional embodiments, and additional features of embodiments are described below with reference to FIGS. 9 and 10, Table 1 below summarizes this notation.

TABLE 1

| Symbol | Description |
|---|---|
| n | RSA modulus for CL signatures |
| p, q | Prime factors of n |
| $QR_n$ | Group of quadratic residues mod n |
| $pk_B$, $sk_B$ | Public key and secret key for entity B |
| S, Z, $R_i$ | Part of the identity provider's public key (for CL signatures) |
| Γ | Modulus of the commitment group |
| ρ | Prime order of a large subgroup of $Z^*_\Gamma$ |
| b | Cofactor of Γ − 1 |
| g, h | Generators of the order p subgroup of $Z^*_\Gamma$ |
| l | Total number of identity attributes received from an identity provider |
| $m_1$ | The master secret |
| A | Ordered set of identity attributes |
| $(m_1, \ldots, m_l)$ | Identity attributes in A |
| $A_k$ | Indices of identity attributes that are known to identity provider |
| $A_h$ | Indices of identity attributes that are hidden to identity provider |
| $A_c$ | Indices of identity attributes for which an identity provider knows a commitment. |
| $A_r$ | Indices of identity attributes revealed during a zero-knowledge proof |
| $C_i$ | Commitment of identity attribute l, i.e., comm($m_i$) |

Figure 9:
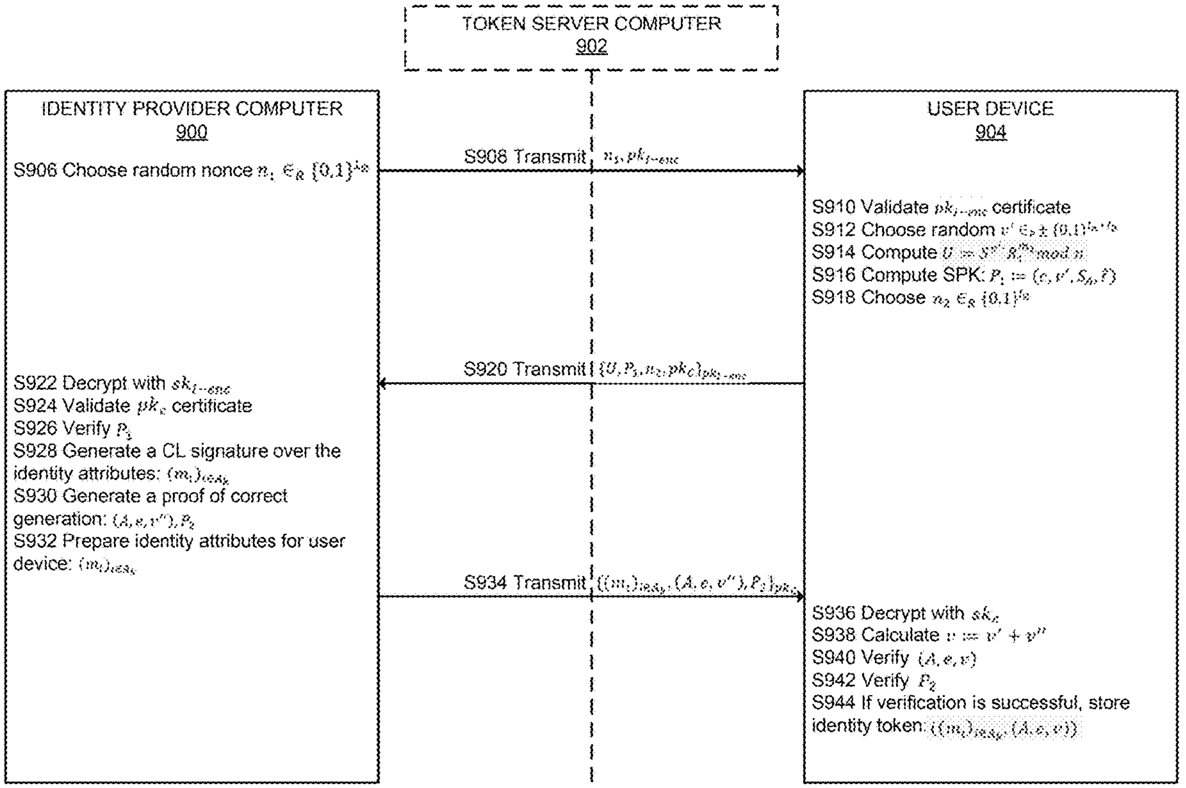
FIG. 9 shows a sequence diagram of a method for identity token provisioning according to some embodiments.

FIG. 9 shows a sequence diagram of a method for identity token provisioning according to some embodiments. This method uses some steps in the IssueCertificateProtocol of Idemix ([4], section 6.1.1), and further details regarding some of the steps in FIGS. 9 (and 10) can be found in Idemix [4]. As stated above with reference to FIG. 5, token server computer 902 can generate the empty identity token and act as an intermediary for communications between identity provider computer 900 and user device 904 (see, e.g., the process flow in FIG. 6 above).

At step S906, the identity provider computer 900 can generate a first random nonce $n_1$. This random nonce can be used by user device 904 to generate a first zero-knowledge proof corresponding to a commitment U of the master secret $m_1$. The commitment of the master secret is used to generate a CL signature corresponding to the identity attributes.

At step S908, the identity provider computer 900 can transmit the first random nonce and a public key corresponding to the identity provider computer 900 $pk_{I\text{-}enc}$. The user device 904 can use this public key to encrypt communications sent to the identity provider computer 900, in order to prevent eavesdropping by token server computer 902. The public key corresponding to the identity provider computer 900 can be appropriately certified to ensure its authenticity.

At step S910, the user device 904 can validate the public key corresponding to the identity provider computer 900, in order to verify that the public key corresponds to the identity provider computer 900, and not to a malicious third party.

At step S912, the user device 904 can generate a random value v'. This random value is subsequently used to generate a value v, which is part of the CL signature corresponding to the identity attributes. Further, v' is used when committing to the master secret $m_1$ at step 914.

At step S914, the user device 904 can generate a commitment U to a master secret $m_1$ (e.g., using the formula shown in FIG. 9, where S and R1 are components of the identity provider computer's (900) public key as shown in the table above, $m_1$ is the user device's (904) master secret, and n is the module for the CL signature), which can be used by the identity provider computer 900 to generate a CL signature over the identity attributes that are to be stored in the identity token.

At step S916, the user device 904 can generate a signature proof of knowledge (SPK) comprising the values (c, ν', $S_A$, $\hat{r}$). This SPK can be used as a first zero-knowledge proof $P_1$, which proves that the commitment to the master secret U was calculated correctly.

At step S918, the user device 904 can generate a second random nonce $n_2$. The second random nonce can be used by the identity provider computer 900 to generate a second zero-knowledge proof $P_2$, which proves correct generation of a CL signature (A, e, ν").

At step S920, the user device 904 can generate a message comprising the commitment to the master secret U, the first zero-knowledge proof $P_1$, the second random nonce $n_2$, and a public key corresponding to the user device 904 ($pk_C$). This public key can be used by the identity provider computer 900, in order to prevent eavesdropping by the token server computer 902. The message can be encrypted with the identity provider's public key, $pk_{I\text{-}enc}$.

At step S922, the identity provider computer 900 can decrypt the message received at step S920 using a private key corresponding to the identity provider computer 900 $sk_{I\text{-}enc}$.

At step S924, the identity provider computer 900 can validate a certificate corresponding to $pk_C$ to verify that the public key corresponding to the user device 904 is valid.

At step S926, the identity provider computer 900 can verify the first zero-knowledge proof generated by the user device 904, in order to verify that the user device 904 generated the commitment U to the master secret correctly.

Prior to step S928, the identity provider computer 900 can select a second random value ν" and can generate a random prime number e. At step S928, the identity provider computer 900 can use the information provided in the message received at step S920, along with additional data to generate a CL signature (A, e, ν") over the requested identity attributes $(m_i)_{i \in A_k}$. In other words, the identify provider computer 900 generates a CL signature over all the identity attributes it is able to provide). This CL signature can later be used by the user device 904 to prove that the identity attributes $(m_i)_{i \in A_k}$ it uses to generate zero-knowledge proofs are legitimate (e.g., during an interaction, as described with reference to FIG. 7).

At step S930, the identity provider computer 900 can generate a second zero-knowledge proof $P_2$, which proves to the user device 904 that the identity provider computer generated the CL signature (A, e, ν") correctly.

At step S932, the identity provider computer 900 can prepare the identity attributes for the user device 904, e.g., by compiling the identity attributes into a messaging format that can be interpreted by user device 904.

At step S934, the identity provider computer 900 can transmit an encrypted message comprising the identity attributes, the CL-signature, and the second cryptographic proof to the user device 904. The identity provider computer can encrypt this message using the public key corresponding to the user device 904, in order to prevent the token server computer 902 from eavesdropping.

At step S936, the user device 904 can decrypt the message using a secret key $sk_C$ corresponding to the public key $pk_C$.

At step S938, the user device 904 can calculate a value v, based on the random value v' generated by the user device 904 and a random value v" generated by the identity provider computer 900. This value v can be used as part of the final CL signature (A, e, v).

At step S940, the user device 904 can verify the CL signature (A, e, v) using the second zero-knowledge proof $P_2$ and the CL signature (A, e, v") sent by the identity provider computer 900.

At step S942, the user device 904 can verify the second zero-knowledge proof, as part of determining the correctness of the CL-signature and identity attributes $(m_i)_{i \in A_k}$.

At step S944, if the CL signature and identity attributes are verified correctly, the user device 904 can populate the empty identity token received from the token server computer 904 and store the identity token in memory.

Figure 10:
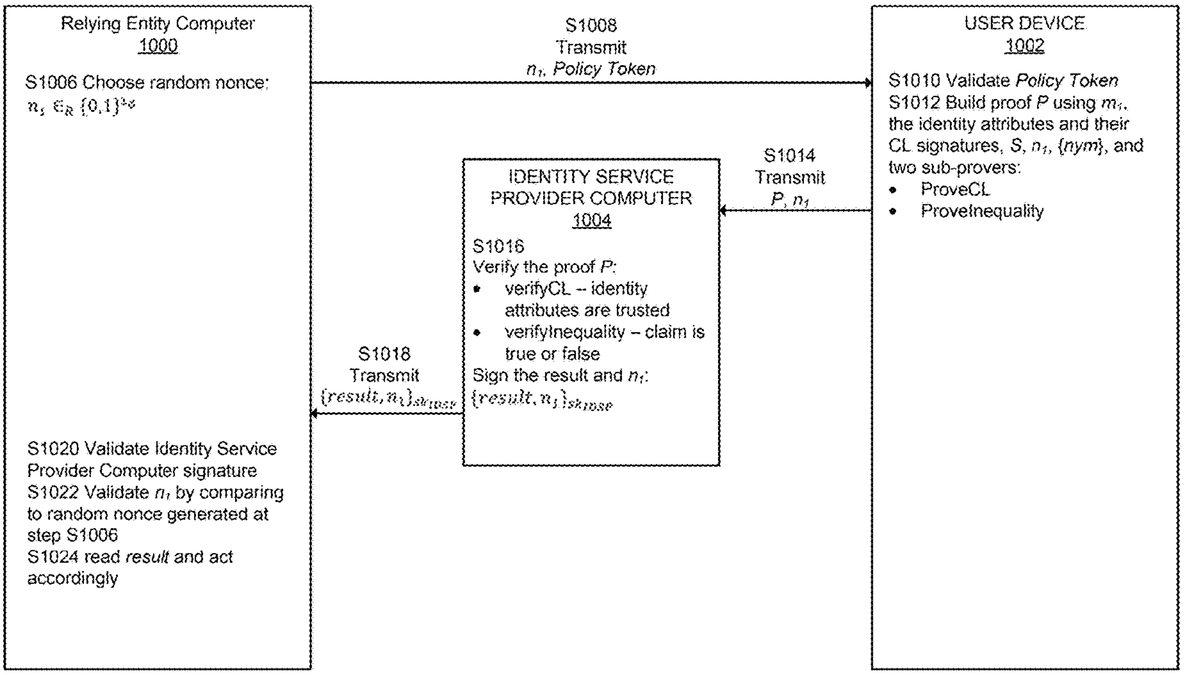
FIG. 10 shows an exemplary interaction (e.g., a transaction, such as sale of alcohol) according to some embodiments.

FIG. 10 shows an exemplary interaction (e.g., a transaction, such as sale of alcohol) according to some embodiments. The process shown in FIG. 10 provides additional details regarding an exemplary interaction relative to prior embodiments. In this interaction, the relying entity computer 1000 wishes to verify that the user is above a certain age (e.g., 21).

At step S1006, the relying entity computer 1000 can choose or otherwise generate a random nonce $n_1$. This random nonce can be used by the user device 1002 to generate a zero-knowledge proof, proving that the user is above a certain age, and that their identity attributes are legitimate (i.e., originated from a trusted identity provider computer).

At step S1008, the relying entity computer 1000 can transmit the random nonce and the policy token to the user device 1002, via, for example, NFC or a QR code, as described above.

At step S1010, the user device 1002 can validate the policy token by evaluating a token server computer signature included in the policy token. In this way, the user device 1002 can determine that the policy token was generated by a legitimate token server computer, rather than an illegitimate token server computer or the relying entity computer 1000.

At step S1012, the user device 1002 can generate a zero-knowledge proof P using the master secret $m_1$, the identity attributes, the CL signatures, S (an issuing specification as described in Idemix [4]), the random nonce $n_1$, a pseudonym {nym}, and two sub-provers: proveCL and proveInequality. The proveCL sub-prover is used to prove the legitimacy of the CL signatures, and thus prove that the identity attributes originated form a legitimate identity provider computer. The proveInequality sub-prover is used to prove an inequality corresponding to an identity attribute. For example, the proveInequality sub-prover can be used to prove that the user's age identity attribute is greater than 21.

At step S1014, the user device 1002 can transmit the zero-knowledge proof P and the cryptographic nonce $n_1$ to the identity service provider computer 1004.

At step S1016, the identity service provider computer 1004 can verify the zero-knowledge proof P and generate a verification message. The identity service provider computer 1004 can verify the zero-knowledge proof P using two sub-verifiers. The first sub-verifier, verifyCL, verifies the sub-proof corresponding to the CL signatures, in order to verify that the identity attributes were produced by a legitimate identity provider computer. The second sub-prover, verifyInequality, verifies the sub-proof corresponding to the inequality (e.g., age >21) in order to verify that, for example, the user is old enough to purchase alcohol.

After verifying the sub-proofs, the identity service provider computer 1004 can generate a verification message containing the results of the verification (result) and the random nonce, $n_1$. The identity service provider computer 1004 can sign this message using a secret key corresponding to the identity service provider computer 1004 $sk_{IDSP}$.

At step S1018, the identity service provider computer 1004 can transmit the verification message to the relying entity computer 1000.

At step S1020, the relying entity computer 1000 can validate the identity service provider computer 1004 signature using a public key corresponding to the identity service provider computer 1004 $pk_{IDSP}$, in order to verify that the verification message was produced by a legitimate identity service provider computer 1004 and not an imposter (such as a malicious user device).

At step S1022, the relying entity computer 1000 can validate the random nonce in the verification message by comparing it to the random nonce generated at step S1006. If these random nonces are the same, it indicates to the relying entity computer 1000 that the correct random nonce was used to generate the zero-knowledge proofs.

At step S1024, the relying entity computer 1000 can read the result in the verification message and act accordingly. For example, if the result indicates the zero-knowledge proofs were verified successfully (e.g., proving that the user is older than 21), the relying entity computer 1000 can complete an alcohol sale with the user of user device 1002. If the result indicates that the zero-knowledge proofs were not verified successfully, the relying entity computer 1000 can deny the sale.

Some embodiments can also support or enable identity token registration, backup, recovery, or synchronization services. Effectively, an encrypted copy of a user's identity token can be stored at a token server computer and/or an identity service provider computer. The token server computer and/or identity service provider computer cannot determine the identity attributes because the token is encrypted. If the user loses their user device, or the memory is inadvertently wiped, or the user acquires a new user device, the user can download or retrieve a copy of their identity token from the token server computer and/or identity service provider computer.

For example, when registering with the identity token backup service, the user could provide a password. This password could be used to generate a symmetric cryptographic key, which is used to encrypt the identity token. The encrypted identity token could then be sent to the token server computer and/or identity service provider computer for storage. When the user wishes to recover the identity token, they can download the encrypted identity token, then use their password to regenerate the cryptographic key and decrypt the identity token.

In addition to the methods described above, the following methods are also contemplated by some embodiments. These include a method performed by an identity service provider computer comprising: receiving, by an identity service provider computer, from a user device, a zero-knowledge proof; verifying, by the identity service provider computer, the zero-knowledge proof; generating, by the identity service provider computer, based on the verification of the zero-knowledge proof, a verification message; cryptographically signing, by the identity service provider computer, the verification message using a private key corresponding to the identity service provider computer; and transmitting, by the identity service provider computer, to a relying entity computer, the verification message, wherein the relying entity computer thereafter performs an interaction with the user device based on the verification message.

These methods also include a method performed by relying entity computer comprising: transmitting, by relying entity computer, to a user device, a cryptographic nonce and a policy token, wherein the user device uses the cryptographic nonce, the policy token, and an identity token stored on the user device to generate a zero-knowledge proof, wherein the user device transmits the zero-knowledge proof to an identity service provider computer, and wherein the identity service provider computer verifies the user device using the zero-knowledge proof and generates a verification message; receiving, by the relying entity computer, from the identity service provider computer, the verification message; evaluating, by the relying entity computer, the verification message; and performing, by the relying entity computer, an interaction with the user device.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:

providing, by a relying party computer to a user device, a policy token, wherein the user device generates a zero-knowledge proof using the policy token and a set of identity attributes stored on the user device and transmits the zero-knowledge proof to an identity service provider computer, which verifies the zero-knowledge proof and generates a verification message;

receiving, by the relying party computer, the verification message; and performing, by the relying party computer, an interaction with the user device based on the verification message.

2. The method of claim 1, wherein the policy token is cryptographically signed using a private key corresponding to a token server computer, and wherein the user device verifies the policy token using a public key corresponding to the token server computer.

3. The method of claim 1, further comprising:

receiving, by the relying party computer from the identity service provider computer, the policy token.

4. The method of claim 1, further comprising:

transmitting, by the relying party computer to the user device, a nonce along with the policy token; and receiving, by the relying party computer from the identity service provider computer, the nonce in the verification message.

5. The method of claim 4, wherein the nonce and a verification result in the verification message are signed using a secret key of the identity service provider computer.

6. The method of claim 5, further comprising:

verifying, by the relying party computer, the signed nonce and the verification result in the verification message with a public key corresponding to the secret key.

7. The method of claim 1, wherein the zero-knowledge proof is used to verify that a user of the user device is of a certain age.

8. The method of claim 1, wherein the identity service provider computer verifies the zero-knowledge proof using two sub-verifiers.

9. The method of claim 1, wherein the policy token is provided by the relying party computer to the user device via NFC or a QR code.

10. The method of claim 1, wherein the policy token comprises one or more predicates, wherein each predicate corresponds to one or more identity attributes from the set of identity attributes, and wherein the zero-knowledge proof corresponds to the one or more predicates and the set of identity attributes.

11. A relying party computer comprising:

a processor; and a non-transitory computer readable medium coupled to the processor, the non-transitory computer readable medium comprising code, executable by the processor, for implementing a method comprising:

providing, to a user device, a policy token, wherein the user device generates a zero-knowledge proof using the policy token and a set of identity attributes stored on the user device and transmits the zero-knowledge proof to an identity service provider computer, which verifies the zero-knowledge proof and generates a verification message;

receiving the verification message; and performing, by the relying party computer, an interaction with the user device based on the verification message.

12. The relying party computer of claim 11, wherein the policy token is cryptographically signed using a private key corresponding to a token server computer.

13. The relying party computer of claim 11, wherein the method further comprises:

receiving, by the relying party computer from the identity service provider computer, the policy token.

14. The relying party computer of claim 11, wherein the method further comprises:

transmitting, by the relying party computer to the user device, a nonce along with the policy token; and receiving, by the relying party computer from the identity service provider computer, the nonce in the verification message.

15. The relying party computer of claim 11, wherein the policy token is provided by the relying party computer to the user device via NFC or a QR code.

16. The relying party computer of claim 11, wherein the policy token comprises one or more predicates, wherein each predicate corresponds to one or more identity attributes from the set of identity attributes, and wherein the zero-knowledge proof corresponds to the one or more predicates and the set of identity attributes.

17. A system comprising:

a relying party computer comprising a processor, and a non-transitory computer readable medium coupled to the processor, the non-transitory computer readable medium comprising code, executable by the processor, for implementing a method comprising providing, to a user device, a policy token, wherein the user device generates a zero-knowledge proof using the policy token and a set of identity attributes stored on the user device and transmits the zero-knowledge proof to an identity service provider computer, which verifies the zero-knowledge proof and generates a verification message, receiving the verification message, and performing, by the relying party computer, an interaction with the user device based on the verification message; and the user device.

18. The system of claim 17, further comprising:

the identity service provider computer.

19. The system of claim 17, wherein the method further comprises:

transmitting, by the relying party computer to the user device, a nonce along with the policy token; and receiving, by the relying party computer from the identity service provider computer, the nonce in the verification message.

20. The system of claim 17, wherein the policy token comprises one or more predicates, wherein each predicate corresponds to one or more identity attributes from the set of identity attributes, and wherein the zero-knowledge proof corresponds to the one or more predicates and the set of identity attributes.

* * * * *